United States Patent
Ota et al.

(10) Patent No.: US 10,559,789 B2
(45) Date of Patent: Feb. 11, 2020

(54) ADAPTER FOR CONNECTING A PLURALITY OF BATTERY PACKS TO A POWER TOOL

(71) Applicant: MAKITA CORPORATION, Anjo-Shi (JP)

(72) Inventors: Tomoyuki Ota, Anjo (JP); Kiyoshi Nishibe, Anjo (JP); Hitoshi Suzuki, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 239 days.

(21) Appl. No.: 15/403,344

(22) Filed: Jan. 11, 2017

(65) Prior Publication Data
US 2017/0125754 A1    May 4, 2017

Related U.S. Application Data

(60) Division of application No. 14/808,090, filed on Jul. 24, 2015, now Pat. No. 9,583,746, which is a
(Continued)

(30) Foreign Application Priority Data

Feb. 12, 2010 (JP) .................................. 2010-029505

(51) Int. Cl.
*A47L 9/02* (2006.01)
*H01M 2/20* (2006.01)
(Continued)

(52) U.S. Cl.
CPC ............. *H01M 2/1055* (2013.01); *B25F 5/00* (2013.01); *H01M 2/10* (2013.01); *H01M 2/1022* (2013.01);
(Continued)

(58) Field of Classification Search
CPC .... H01M 2/1055; H01M 2/10; H01M 2/1022; H01M 2/1027; H01M 2/1033;
(Continued)

(56) References Cited

U.S. PATENT DOCUMENTS

| 3,665,502 A | 5/1972 | Means |
| 3,979,657 A | 9/1976 | Yorksie |

(Continued)

FOREIGN PATENT DOCUMENTS

| CN | 101064439 A | 10/2007 |
| CN | 100495852 | 6/2009 |

(Continued)

OTHER PUBLICATIONS

Decision to Refuse European patent application No. 11 703 493.4 dated Nov. 22, 2017, including examined claims and Applicant arguments.

(Continued)

*Primary Examiner* — Dung Van Nguyen
(74) *Attorney, Agent, or Firm* — J-Tek Law PLLC; Jeffrey D. Tekanic; Scott T. Wakeman

(57) ABSTRACT

An adapter connects a plurality of first battery packs, each having a nominal voltage of about 18-36 volts, in series to an power tool having a rated voltage that is 36 volts or higher. The power tool includes a second battery interface configured to removably attach a second battery pack. The adapter includes a plurality of first battery interfaces configured to removably attach the plurality of first battery packs and having a different physical configuration than the second battery interface. A connector of the adapter is configured to be removably attached to the second battery interface. A plurality of visual indicators is disposed on the adapter such that they have the same or substantially the same illumination direction and they visually indicate at (Continued)

least a level of charge of each of the first battery packs attached to the adapter.

20 Claims, 22 Drawing Sheets

Related U.S. Application Data continuation of application No. 13/770,332, filed on Feb. 19, 2013, now abandoned, which is a continuation of application No. 12/888,100, filed on Sep. 22, 2010, now Pat. No. 8,984,711.

(51) Int. Cl.
| | |
|---|---|
| *H01M 2/10* | (2006.01) |
| *B25F 5/00* | (2006.01) |
| *H01M 10/48* | (2006.01) |
| *H02J 7/00* | (2006.01) |
| *H01M 2/34* | (2006.01) |
| *H01M 6/42* | (2006.01) |
| *H01M 10/0525* | (2010.01) |
| *H01M 10/058* | (2010.01) |

(52) U.S. Cl.
CPC ....... *H01M 2/1027* (2013.01); *H01M 2/1033* (2013.01); *H01M 2/1061* (2013.01); *H01M 2/34* (2013.01); *H01M 10/48* (2013.01); *H01M 10/488* (2013.01); *H02J 7/0021* (2013.01); *H02J 7/0045* (2013.01); *H02J 7/0063* (2013.01); *B23B 2260/024* (2013.01); *H01M 6/42* (2013.01); *H01M 10/058* (2013.01); *H01M 10/0525* (2013.01); *H01M 2200/103* (2013.01); *H01M 2220/30* (2013.01); *H02J 2007/004* (2013.01)

(58) Field of Classification Search
CPC ...... H01M 2/1061; H01M 2/34; H01M 10/48; H01M 10/488; H01M 6/42; H01M 10/0525; H01M 10/058; H01M 2200/103; H01M 2200/30; B25F 5/00; H02J 7/0021; H02J 7/0045; H02J 7/0063; H02J 2007/004
See application file for complete search history.

(56) References Cited

U.S. PATENT DOCUMENTS

| | | | |
|---|---|---|---|
| 4,081,738 A | 3/1978 | Roller |
| 4,184,197 A | 1/1980 | Cuk et al. |
| 4,451,743 A | 5/1984 | Suzuki et al. |
| 4,705,934 A | 11/1987 | Winkler |
| 4,713,555 A | 12/1987 | Lee |
| 4,739,242 A | 4/1988 | McCarty et al. |
| 4,779,687 A | 10/1988 | Schreiber et al. |
| 4,896,026 A | 1/1990 | Krichever et al. |
| 4,988,584 A | 1/1991 | Shaper |
| 5,015,546 A | 5/1991 | Dulaney et al. |
| 5,028,858 A | 7/1991 | Schnizler et al. |
| 5,084,637 A | 1/1992 | Gregor |
| 5,089,738 A | 2/1992 | Bergqvist et al. |
| 5,121,046 A | 6/1992 | McCullough |
| 5,477,124 A | 12/1995 | Tamai |
| 5,530,336 A | 6/1996 | Eguchi et al. |
| 5,548,196 A | 8/1996 | Lim |
| 5,553,675 A | 9/1996 | Pitzen et al. |
| 5,576,941 A | 11/1996 | Nguyen et al. |
| 5,680,026 A | 10/1997 | Lueschen |
| 5,712,553 A | 1/1998 | Hallberg |
| 5,718,985 A | 2/1998 | Bunyea et al. |
| 5,805,068 A | 9/1998 | Bradus |
| 5,814,972 A | 9/1998 | Shimada et al. |
| 5,945,806 A | 8/1999 | Faulk |
| 6,008,623 A | 12/1999 | Chen et al. |
| 6,043,626 A | 3/2000 | Snyder et al. |
| 6,104,162 A | 8/2000 | Sainsbury et al. |
| 6,172,860 B1 | 1/2001 | Yoshimizu et al. |
| 6,192,125 B1 | 2/2001 | Norsworthy et al. |
| 6,204,632 B1 | 3/2001 | Nierescher et al. |
| 6,218,806 B1 | 4/2001 | Brotto et al. |
| 6,237,698 B1 | 5/2001 | Carrier et al. |
| 6,268,711 B1 | 7/2001 | Bearfield |
| 6,286,609 B1 | 9/2001 | Carrier et al. |
| 6,324,339 B1 | 11/2001 | Hudson et al. |
| 6,373,226 B1 | 4/2002 | Itou et al. |
| 6,430,692 B1 | 8/2002 | Kimble et al. |
| 6,459,175 B1 | 10/2002 | Potega |
| 6,486,635 B1 | 11/2002 | Matsuda et al. |
| 6,501,197 B1 | 12/2002 | Cornog et al. |
| 6,502,949 B1 | 1/2003 | Horiyama et al. |
| 6,507,506 B1 | 1/2003 | Pinas et al. |
| 6,522,902 B2 | 2/2003 | Nishihara et al. |
| 6,577,104 B2 | 6/2003 | Sakakibara |
| 6,605,923 B1 | 8/2003 | Kellogg |
| 6,664,748 B2 | 12/2003 | Kushida et al. |
| 6,683,439 B2 | 1/2004 | Takano et al. |
| 6,727,679 B2 | 4/2004 | Kovarik et al. |
| 6,729,413 B2 | 5/2004 | Turner et al. |
| 6,804,461 B1 | 10/2004 | Hagiuda et al. |
| 6,812,672 B2 | 11/2004 | Tamai et al. |
| 6,815,930 B2 | 11/2004 | Goodman |
| 6,836,614 B2 | 12/2004 | Gilmore |
| 6,876,173 B2 | 4/2005 | Mastaler et al. |
| 6,889,038 B2 | 5/2005 | Khosrowbeygi |
| 6,913,087 B1 | 7/2005 | Brotto et al. |
| 6,933,689 B2 | 8/2005 | Yamamoto |
| 6,942,359 B2 | 9/2005 | Furth et al. |
| 7,002,265 B2 | 2/2006 | Potega |
| 7,160,132 B2 | 1/2007 | Phillips et al. |
| 7,176,656 B2 | 2/2007 | Feldmann |
| 7,270,910 B2 | 9/2007 | Yahnker et al. |
| 7,371,476 B2 | 5/2008 | Aso |
| 7,414,337 B2 | 8/2008 | Wilkinson et al. |
| 7,453,234 B2 | 11/2008 | Phillips et al. |
| 7,496,460 B2 | 2/2009 | Hornick et al. |
| 7,580,803 B2 | 8/2009 | Hornick et al. |
| 7,583,060 B2 | 9/2009 | Kim |
| 7,629,766 B2 | 12/2009 | Sadow |
| 7,656,131 B2 | 2/2010 | Embrey et al. |
| 7,719,234 B2 | 5/2010 | Carrier et al. |
| 7,807,293 B2 | 10/2010 | Hanawa et al. |
| 8,018,202 B2 | 9/2011 | Masson et al. |
| 8,174,237 B2 | 5/2012 | Kosugi et al. |
| 8,251,157 B2 | 8/2012 | Gray et al. |
| 8,564,242 B2 | 10/2013 | Hansford et al. |
| 2002/0149346 A1 | 10/2002 | Sakakibara |
| 2002/0175656 A1 | 11/2002 | Matsunaga et al. |
| 2003/0044689 A1 | 3/2003 | Miyazaki et al. |
| 2003/0090162 A1 | 5/2003 | Cornog et al. |
| 2003/0095403 A1 | 5/2003 | Tang |
| 2003/0102844 A1 | 6/2003 | Bailey |
| 2003/0137279 A1 | 7/2003 | Baur et al. |
| 2003/0152830 A1 | 8/2003 | Eaves |
| 2004/0263119 A1 | 12/2004 | Meyer et al. |
| 2005/0007068 A1 | 1/2005 | Johnson et al. |
| 2005/0073282 A1 | 4/2005 | Carrier et al. |
| 2005/0082920 A1 | 4/2005 | Heigl et al. |
| 2005/0161305 A1 | 7/2005 | Jenni et al. |
| 2005/0218867 A1 | 10/2005 | Phillips et al. |
| 2005/0258801 A9 | 11/2005 | Johnson et al. |
| 2005/0280393 A1 | 12/2005 | Feldmann |
| 2006/0077603 A1 | 4/2006 | Kim |
| 2006/0087284 A1 | 4/2006 | Phillips et al. |
| 2006/0214627 A1 | 9/2006 | Ito et al. |
| 2006/0220605 A1 | 10/2006 | Funabashi et al. |
| 2006/0244414 A1 | 11/2006 | Lay |
| 2006/0267548 A1 | 11/2006 | Uehlein-Proctor et al. |
| 2006/0267556 A1 | 11/2006 | Uehlein-Proctor et al. |
| 2007/0103113 A1 | 5/2007 | Embrey et al. |
| 2007/0103118 A1 | 5/2007 | Takagi et al. |

(56) References Cited

U.S. PATENT DOCUMENTS

| | | |
|---|---|---|
| 2007/0108944 A1 | 5/2007 | Pellenc |
| 2007/0148539 A1 | 6/2007 | Pellenc |
| 2007/0236173 A1 | 10/2007 | Kimura |
| 2007/0241758 A1 | 10/2007 | Kamata |
| 2007/0252553 A1 | 11/2007 | Mori et al. |
| 2007/0279902 A1 | 12/2007 | Kim |
| 2008/0012526 A1 | 1/2008 | Sadow |
| 2008/0059089 A1 | 3/2008 | Hornick et al. |
| 2008/0203995 A1 | 8/2008 | Carrier et al. |
| 2008/0311795 A1 | 12/2008 | Brotto et al. |
| 2009/0031865 A1 | 2/2009 | Alberti et al. |
| 2009/0102420 A1 | 4/2009 | Uehlein-Proctor et al. |
| 2009/0108806 A1 | 4/2009 | Takano et al. |
| 2009/0224725 A1 | 9/2009 | Tatebayashi et al. |
| 2009/0237012 A1 | 9/2009 | Yokoyama et al. |
| 2009/0289805 A1 | 11/2009 | Patrick et al. |
| 2010/0072975 A1 | 3/2010 | Hori |
| 2010/0109435 A1 | 5/2010 | Ahmadi et al. |
| 2010/0133913 A1 | 6/2010 | Iida |
| 2010/0192314 A1 | 8/2010 | Otsuka et al. |
| 2010/0219792 A1 | 9/2010 | Tsumura |
| 2010/0283427 A1 | 11/2010 | Sugiyama et al. |
| 2011/0147031 A1 | 6/2011 | Wolf et al. |
| 2011/0193413 A1 | 8/2011 | Kudo et al. |
| 2011/0197389 A1 | 8/2011 | Oda et al. |
| 2011/0198103 A1 | 8/2011 | Suzuki |
| 2011/0221604 A1 | 9/2011 | Johnson |
| 2011/0260686 A1 | 10/2011 | Ford |
| 2011/0284257 A1 | 11/2011 | Ogino et al. |
| 2011/0311842 A1 | 12/2011 | Fang |
| 2012/0024552 A1 | 2/2012 | Kawano et al. |
| 2012/0037385 A1 | 2/2012 | Suzuki et al. |
| 2012/0212199 A1 | 8/2012 | Amer et al. |
| 2012/0235593 A1 | 9/2012 | Snyder et al. |
| 2012/0236551 A1 | 9/2012 | Sharrah et al. |
| 2012/0262035 A1 | 10/2012 | Takano et al. |
| 2012/0301762 A1 | 11/2012 | Welker et al. |
| 2013/0002175 A1 | 1/2013 | Shimizu et al. |
| 2013/0025893 A1 | 1/2013 | Ota et al. |
| 2013/0062952 A1 | 3/2013 | Park et al. |
| 2013/0164589 A1 | 6/2013 | Ota et al. |
| 2013/0187461 A1 | 7/2013 | Goto et al. |

FOREIGN PATENT DOCUMENTS

| | | |
|---|---|---|
| CN | 101587171 A | 11/2009 |
| DE | 102008040061 A | 1/2010 |
| EP | 1312855 A | 5/2003 |
| GB | 2226716 A | 7/1990 |
| JP | H362783 | 6/1991 |
| JP | H73983 U | 1/1995 |
| JP | H08241705 A | 9/1996 |
| JP | H11262172 A | 9/1999 |
| JP | 2001300867 A | 10/2001 |
| JP | 2002027675 | 1/2002 |
| JP | 2002210678 A | 7/2002 |
| JP | 2003070179 A | 3/2003 |
| JP | 2004152580 A | 5/2004 |
| JP | 2005131770 A | 5/2005 |
| JP | 2005150079 | 6/2005 |
| JP | 2005192330 A | 7/2005 |
| JP | 2005278375 A | 10/2005 |
| JP | 2006081390 A | 3/2006 |
| JP | 2006280043 A | 10/2006 |
| JP | 2006281404 A | 10/2006 |
| JP | 2006334773 A | 12/2006 |
| JP | 2007511380 | 5/2007 |
| JP | 2007229827 A | 9/2007 |
| JP | 2007256114 A | 10/2007 |
| JP | 2007280757 A | 10/2007 |
| JP | 2008000835 A | 1/2008 |
| JP | 2008518798 A | 6/2008 |
| JP | 2008178278 A | 7/2008 |
| JP | 2008246481 A | 10/2008 |
| JP | 2009302030 A | 12/2009 |
| JP | 2010178773 A | 8/2010 |
| JP | 2010220632 A | 10/2010 |
| JP | 2011526217 A | 10/2011 |
| WO | 9933124 A | 7/1999 |
| WO | 2006055303 A2 | 5/2006 |
| WO | 2010000535 A1 | 1/2010 |

OTHER PUBLICATIONS

Office Action from the Japanese Patent Office dated May 29, 2018 in related Japanese application No. 2017-000208, and translation thereof.
Final Office Action dated Jan. 16, 2014 in related U.S. Appl. No. 12/888,101.
International Search Report for counterpart PCT application No. PCT/JP2011/051147 (including the claims searched in the ISR).
International Search Report for related PCT application No. PCT/JP2011/051146 (including the claims searched in the ISR).
Japanese Office Action dated Oct. 28, 2014 and English translation from related application JP 2010-029505.
Liu He-ping et al., "Anti-Common Mode Multiplex Voltage Measurement for the EV Battery", Automatization Technology and Application, vol. 27, No. 5, 2008, pp. 97-99 and 111, including English abstract.
Notice of Allowance dated Apr. 10, 2014 in related U.S. Appl. No. 12/888,101.
Office Action from Japanese Patent Office dated Oct. 29, 2013 for counterpart JP application No. 2010-029505, including English translation thereof.
Office Action from Japanese Patent Office dated Oct. 29, 2013 for counterpart JP application No. 2010-029506, including English translation thereof.
Office Action from Russian Patent Office dated Nov. 7, 2013 for counterpart RU application No. 2012138951, including English translation thereof.
Office Action from the Chinese Patent Office dated Apr. 1, 2014 for counterpart Chinese patent application No. 201180009359.X, including English translation thereof.
Office Action from the Chinese Patent Office dated May 5, 2014 for counterpart Chinese patent application No. 201180009302.X, including partial English translation thereof.
Office Action from the Chinese Patent Office dated Nov. 2, 2014 for counterpart Chinese patent application No. 201180009302.X, including partial English translation thereof.
Office Action from the European Patent Office dated Jun. 8, 2015 in counterpart EP application No. 11703493.4, including examined claims 1-15.
Office Action from the Japanese Patent Office dated Jun. 14, 2016 in related Japanese application No. 2015-158638, and translation of substantive portions thereof.
Office Action from the Japanese Patent Office dated May 12, 2015 in related Japanese application No. 2014-004884, and translation thereof.
Office Action dated Jun. 8, 2012 for related U.S. Appl. No. 12/888,101.
Office Action dated Sep. 11, 2013 for related U.S. Appl. No. 12/888,101.
Written Opinion for counterpart PCT application No. PCT/JP2011/051147 (see corresponding ISR for examined claims).
Written Opinion for related PCT application No. PCT/JP2011/051146 (see corresponding ISR for examined claims).
Yang Suo et al., "A Battery Monitoring System Based on CAN Bus for Electrical Vehicles", Journal of Guizhou University of Technology, vol. 33, No. 3, Apr. 2004, pp. 90-94 and 100, including English abstract attached at the end.
Communication from EPO dated Oct. 16, 2017 in related EP application No. 11703493.4, including Annex to Communication, examined claims of the Main Request and Auxiliary Requests I-IV and Applicant's written submission.
Summons to attend oral proceedings from the European Patent Office dated May 30, 2017 in related EP Nno. 11703493.4, including grounds for rejection and examined claims 1-14.

(56) References Cited

OTHER PUBLICATIONS

Office Action from the Japanese Patent Office dated Dec. 5, 2017 in related Japanese application No. 2017-000208, and translation thereof.

Office Action from Japanese Patent Office dated Jul. 23, 2019 for counterpart JP application No. 2018-158889, including English translation thereof.

Prior Art

Prior Art

Prior Art

Prior Art

ADAPTER FOR CONNECTING A PLURALITY OF BATTERY PACKS TO A POWER TOOL

CROSS-REFERENCE TO RELATED APPLICATIONS

This application is a divisional application of U.S. Ser. No. 14/808,090, now pending, which is a continuation of U.S. Ser. No. 13/770,332 filed on Feb. 19, 2013, now abandoned, which is a continuation of U.S. Ser. No. 12/888,100 filed on Sep. 22, 2010, now U.S. Pat. No. 8,984,711, which claims priority to Japanese Patent Application No. 2010-029505 filed on Feb. 12, 2010, the contents of which are hereby incorporated by reference into the present application.

TECHNICAL FIELD

The present invention relates to an electric power tool powered by a plurality of battery packs and an adapter therefor.

DESCRIPTION OF RELATED ART

U.S. Pat. No. 5,028,858 discloses an electric power tool that simultaneously uses two battery packs as a power source. In this electric power tool, the two battery packs are connected in series so that a high voltage is supplied to an electric motor of the electric power tool. As a result, a higher voltage output suitable for power-intensive operations can be generated, which output is higher than is possible when only one battery pack is used as the power source.

SUMMARY

When battery packs are connected in series, the battery packs can be damaged in some situations. For example, when the charge states of the two battery packs differ, one battery pack can become over-discharged and then may be charged by the other battery pack in the reverse direction (i.e. reverse charging). In this case, the over-discharged battery pack may be damaged so seriously that it is no longer useable.

In an attempt to avoid this problem, U.S. Pat. No. 5,028,858 disclosed the use of two light-emitting diodes for indicating the respective charge states of the two battery packs. However, even when such indicators are provided, the battery packs can still be over-discharged or become overheated unless the user can see the indicators properly and easily. In particular, when a plurality of indicators is provided, the user must diligently watch all of the indicators. If the user does not see an indicator that is indicating an abnormality, because the indicator is located in a position not readily visible to the user, the battery pack corresponding to the indicator can still be over-discharged or become overheated.

In one aspect of the present teachings, this problem is addressed by arranging a plurality of indicators configured to indicate at least one condition of each respective battery pack such that all of the indicators are simultaneously viewable by the electric power tool user. Therefore, the information being communicated by all of the indicators can be conveniently and reliably conveyed to the user, such that the likelihood of a battery abnormality, which is being indicated for one or more of the battery packs, being overlooked is substantially reduced.

In one embodiment of the present teachings, an electric power tool preferably comprises a main body supporting a tool and an electric motor housed in the main body. A plurality of first battery interfaces is provided and each battery interface is configured to removably receive or attach one first battery pack. The plurality of first battery interfaces electrically connect a plurality of attached first battery packs in series with the electric motor. A plurality of indicators is provided and each indicator is configured to indicate at least one condition of one first battery pack attached to one of the first battery interfaces. The plurality of indicators is arranged such that all of the indicators are simultaneously viewable or visible to a single tool user.

With such a power tool, the tool user can conveniently and reliably view or see all of the indicators simultaneously and thus can visually recognize the respective conditions of the attached battery packs simultaneously. As a result, if an abnormality is indicated by one or more of the indicators, the tool user can immediately stop the usage of the electric power tool and thereby avoid unnecessary, and possibly irreparable, damage to the battery pack(s).

The present teachings can be applied to any type of cordless electric power tool, including but not limited to electric power tools for processing metals, electric power tools for processing wood, electric power tools for processing stone, and electric power tools for gardening. Specific examples include, but are not limited to, electric drills, electric impact and screw drivers, electric impact wrenches, electric grinders, electric circular saws, electric reciprocating saws, electric jig saws, electric band saws, electric hammers, electric cutters, electric chain saws, electric planers, electric nailers (including electric rivet guns), electric staplers, electric shears, electric hedge trimmers, electric lawn clippers, electric lawn mowers, electric brush cutters, electric blowers (leaf blowers), electric flashlights, electric concrete vibrators and electric vacuum cleaners.

In one embodiment of the present teachings, it is preferred that each battery pack comprises a plurality of lithium-ion cells and the nominal voltage of the battery packs is equal to or greater than 7.0 volts, more preferably equal to or greater than 12.0 volts and even more preferably equal to or greater than 18.0 volts. Over-discharging and overheating can cause significant damage to lithium-ion cells. Consequently, the present teachings are advantageous for preventing the lithium-ion cells from over-discharging and becoming overheated, thereby lengthening the service life of the battery packs.

In another embodiment, an electric power tool that normally operates at a rated voltage of 36 volts is preferably driven by two battery packs, each comprising a plurality of lithium-ion cells and each having a nominal voltage of 18 volts. In such an embodiment, the electric power tool having a higher output can be operated with the readily-available lower-voltage battery packs. Thus, the higher-voltage electric power tool (e.g., a 36 volt tool) can be used even if a corresponding high-voltage battery pack (i.e. a 36 volt battery pack) is not available to the user. Such an embodiment is also advantageous, because the lower-voltage battery pack (e.g., an 18 volt battery pack) can also be used with corresponding lower-voltage power tools (e.g., an 18 volt tool), thereby providing greater flexibility and convenience to the user.

The nominal voltage of a typical lithium-ion cell is 3.6 volts. Therefore, a battery pack having a nominal voltage of 18 volts includes at least five lithium-ion cells connected in series. The battery pack having a nominal voltage of 18 volts may also include, for example, ten lithium-ion cells, wherein five pairs of lithium-ion cells are connected in parallel, and the five pairs of parallel-connected lithium-ion cells are connected in series, whereby a voltage of 18 volts is output. In a similar manner, a battery pack having a nominal voltage of 18 volts can also include 15 or more lithium-ion cells by using such parallel- and series-connected cells. The higher the number of lithium-ion cells, the greater the capacity of the battery pack and consequently the smaller the electric current flowing in each lithium-ion cell during discharge of the battery due to a load being driven thereby.

DETAILED DESCRIPTION OF THE INVENTION

Figure 1:
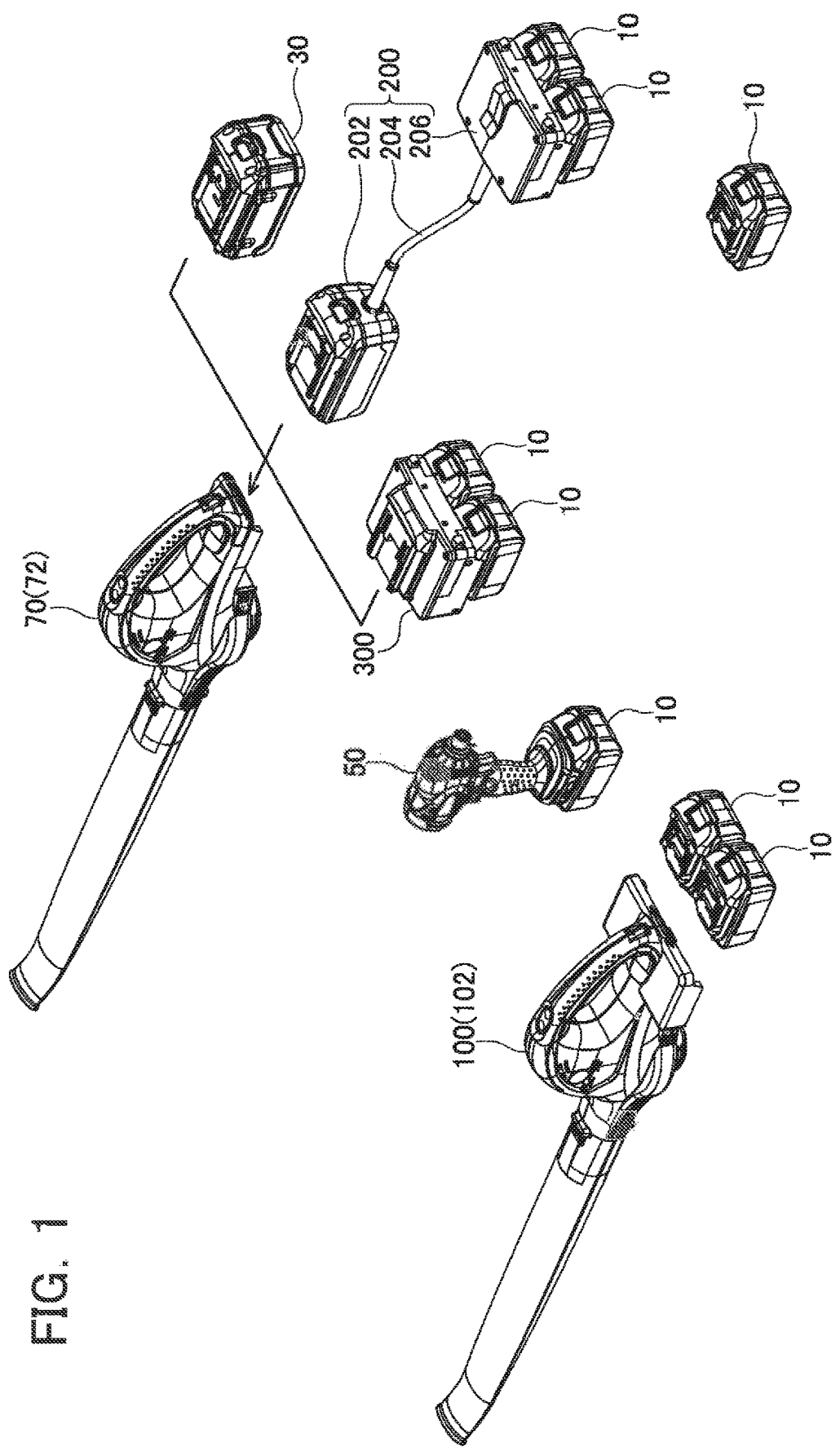
FIG. 1 shows a group of products according to one embodiment of the present teachings.

FIG. 1 shows an exemplary, non-limiting group of cordless power tool products according to one embodiment of the present teachings. As shown in FIG. 1, the group of products includes two types of battery packs 10, 30, three types of electric power tools 50, 70, 100, and two types of adapters 200, 300. The "high-voltage" electric power tool 70 is normally intended to use a single "high-voltage" battery pack 30 as a power source. However, the adapters 200, 300 may serve to electrically connect a plurality of "low-voltage" battery packs 10 to a main body 72 of the electric power tool 70 so that the electric power tool 70 is supplied with the same or substantially the same voltage as the "high-voltage" battery pack 30.

In the present exemplary embodiment, the first battery pack 10 has a nominal voltage of 18 volts and the second battery pack 30 has a nominal voltage of 36 volts. For the sake of convenience in the following description, the first battery pack 10 having the nominal voltage of 18 volts will also be referred to as a "low-voltage battery pack 10" and the second battery pack 30 having the nominal voltage of 36 volts will also be referred to as a "high-voltage battery pack 30".

The low-voltage battery pack 10 comprises (at least) five lithium-ion cells connected in series. The high-voltage battery pack 30 comprises (at least) ten lithium-ion cells connected in series. The two types of battery packs 10, 30 are preferably rechargeable using a battery charger (not shown in the figures) after being used as power sources for the electric tools 50, 70, 100. Further, the two types of battery packs 10, 30 are preferably so-called "slide-type" battery packs that are attached by sliding into or onto corresponding engagement portions of the electric power tools 50, 70, 100, the adapters 200, 300 or the charger. Such battery packs 10, 30 have already been put to practical use. In particular, the low-voltage battery pack 10 with the nominal voltage of 18 volts has been widely used. However, the structure of the battery pack connection is not particularly limited and a wide variety of battery pack connection mechanisms known in the art also may be advantageously utilized with the present teachings.

The low-voltage battery pack 10 can incorporate, for example, ten lithium-ion cells, rather than five lithium-ion cells, as was discussed above at the end of the Summary section. In this case, the ten lithium-ion cells comprise five pairs of lithium-ion cells connected in parallel, and the five pairs of parallel-connected lithium-ion cells are connected in series to output a voltage of 18 volts. Likewise, the high-voltage battery pack 30 can incorporate, for example, twenty lithium-ion cells, rather than ten lithium-ion cells. In this case, the twenty lithium-ion cells comprise ten pairs of lithium-ion cells connected in parallel and the ten pairs of parallel-connected lithium-ion cells are connected in series to output a voltage of 36 volts.

In the present exemplary embodiment, the "low-voltage" electric power tool 50 is designed to operate at a nominal voltage of 18 volts and the other two "high-voltage" electric tools 70, 100 are designed to operate at a nominal voltage of 36 volts. For the sake of convenience in the following description, the electric tool 50 operating at the nominal voltage of 18 volts will be referred to as a "low-voltage electric (power) tool 50", and the electric tools 70, 100 operating at the nominal voltage of 36 volts will be referred to as "high-voltage electric (power) tools 70, 100". As will be understood, however, the terms "low-voltage" and "high-voltage" are relative terms and are merely meant to indicate that two battery packs, which normally supply currents at different voltages, and two tools, which normally operate at different voltages, are contemplated by this aspect of the present teachings. It is not necessary that the high-voltage applications are twice the voltage of the low-voltage applications or, in fact, are any particular multiple thereof. For example, in certain applications of the present teachings, two low-voltage (e.g., 18-volt) battery packs 10 may be connected in series to a higher-voltage electric power tool that normally operates at a rated voltage that is not a multiple of the low-voltage battery packs 10, such as, e.g., 24 volts. In this case, voltage step-down circuitry is preferably provided either in the tool or in an adapter 200, 300 that connects the battery packs 10 to the tool.

Figure 17:
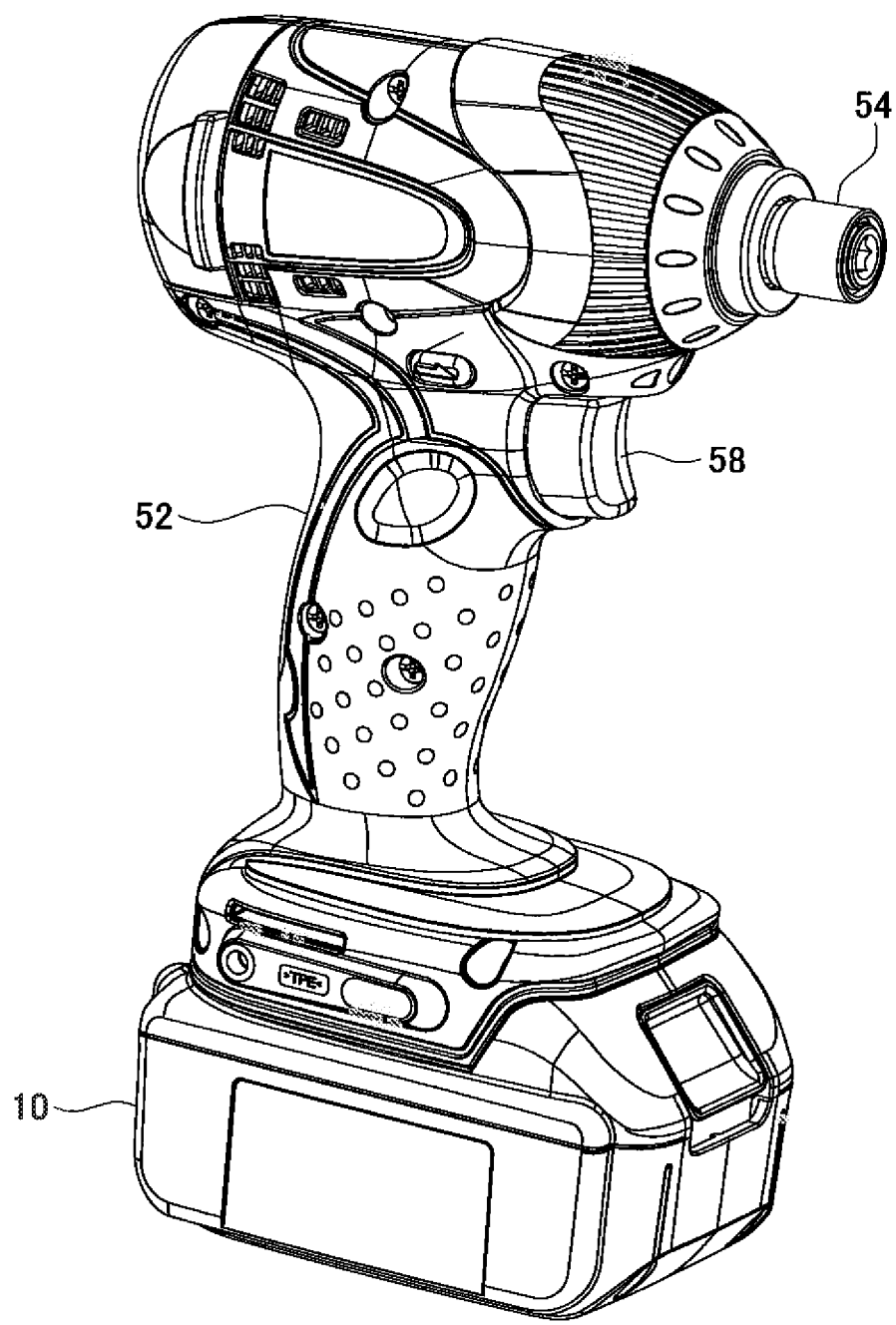
FIG. 17 shows a known low-voltage electric tool using one low-voltage battery pack as a power source.
Figure 18:
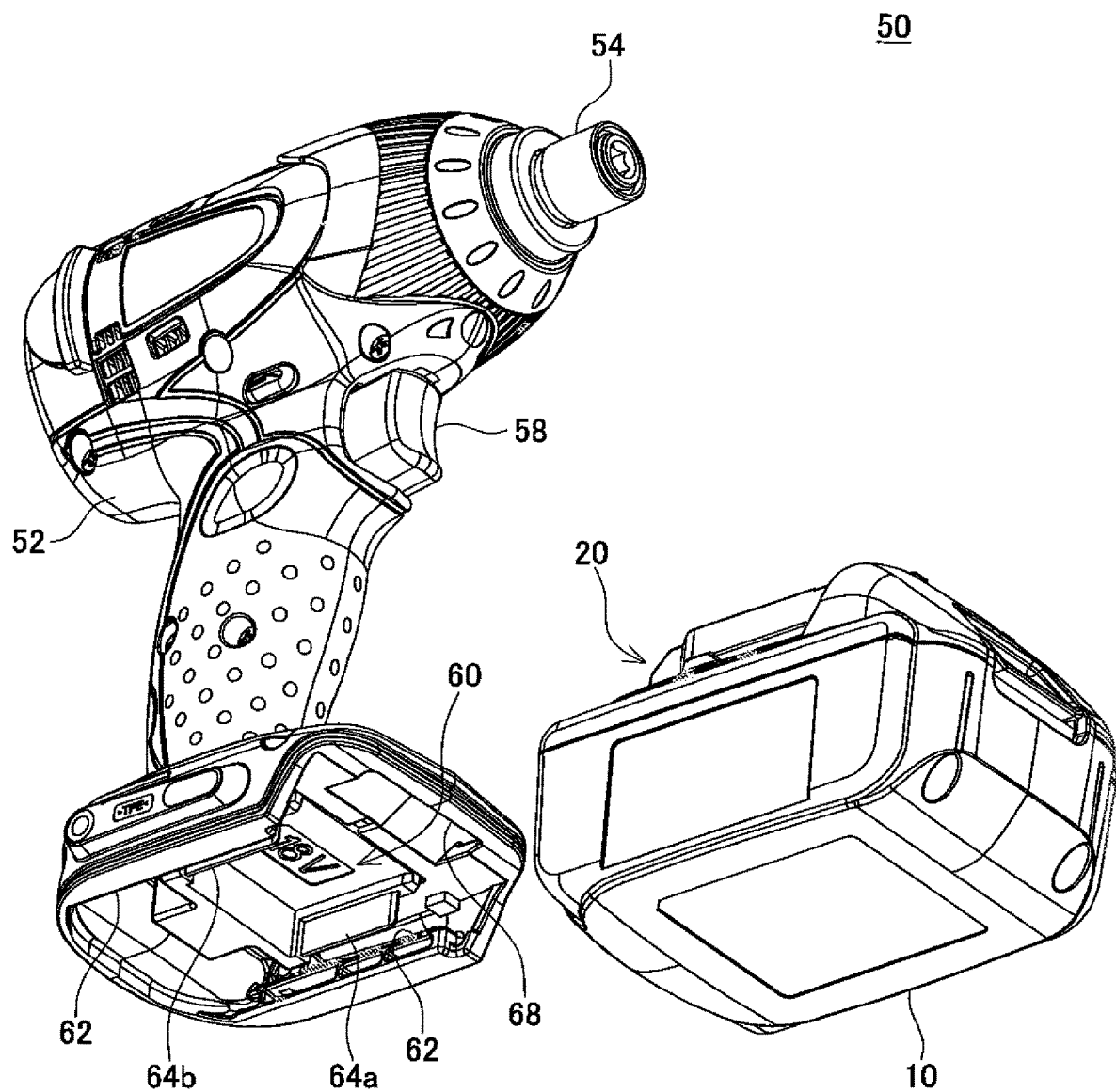
FIG. 18 is a bottom view corresponding to FIG. 17 after the low-voltage battery pack has been detached from the main body of the low-voltage electric tool.

As shown in FIG. 17 and FIG. 18, the low-voltage electric tool 50 is designed to normally use one low-voltage battery pack 10 as its sole power source. This low-voltage electric tool 50 is for example an electric impact driver and drives a tool chuck 54 in response to the operation of a main switch 58. A driver set, which is a tool, can be mounted on the tool chuck 54. Such a low-voltage electric tool 50 has already been put to practical use and has been widely sold together with the low-voltage battery pack 10 having the nominal voltage of 18 volts.

The main body 52 of the low-voltage electric tool 50 includes one battery interface 60. The battery interface 60 is configured to removably receive or attach the low-voltage battery pack 10, and the low-voltage battery pack 10 can be slidably received or attached therein. The battery interface 60 has a pair of rails 62, a positive electrode input terminal 64a, a negative electrode input terminal 64b, and a latch receiving hole 68. A battery controller input/output terminal is also preferably provided, but is not shown in FIG. 18.

Figure 19:
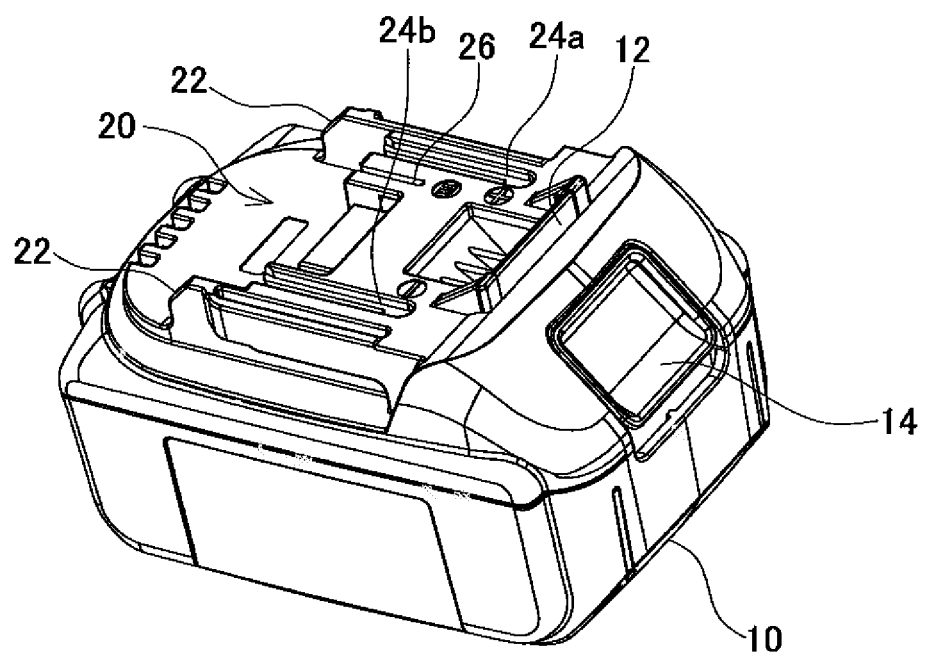
FIG. 19 shows the low-voltage battery pack in greater detail.

As shown in FIG. 19, the low-voltage battery pack 10 includes a connector 20 that can be slidingly inserted into the battery interface 60. The connector 20 includes a pair of rails 22, a positive electrode output terminal 24a, a negative electrode output terminal 24b, and an autostop terminal 26. When the low-voltage battery pack 10 is slidably attached to the battery interface 60, the positive electrode output terminal 24a of the low-voltage battery pack 10 is electrically connected to the positive electrode input terminal 64a of the main body 52, and the negative electrode output terminal 24b of the low-voltage battery pack 10 is electrically connected to the negative electrode input terminal 64b of the main body 52. In addition, the autostop terminal 26 is connected to the battery controller input/output terminal. As a result of this sliding connection, the low-voltage battery pack 10 is also physically connected to the main body 52 of the low-voltage electric tool 50 and the battery cells 16 (see e.g., FIG. 5) are electrically connected with the internal circuitry of the tool 50. Further, the low-voltage battery pack 10 has a latch member 12 that engages with the latch receiving hole 68 of the battery interface 60 and detachably affixes the low-voltage battery pack 10 to the battery interface 60. The latch member 12 can be released from the latch receiving hole 68 by operating a latch release button 14.

Figure 20:
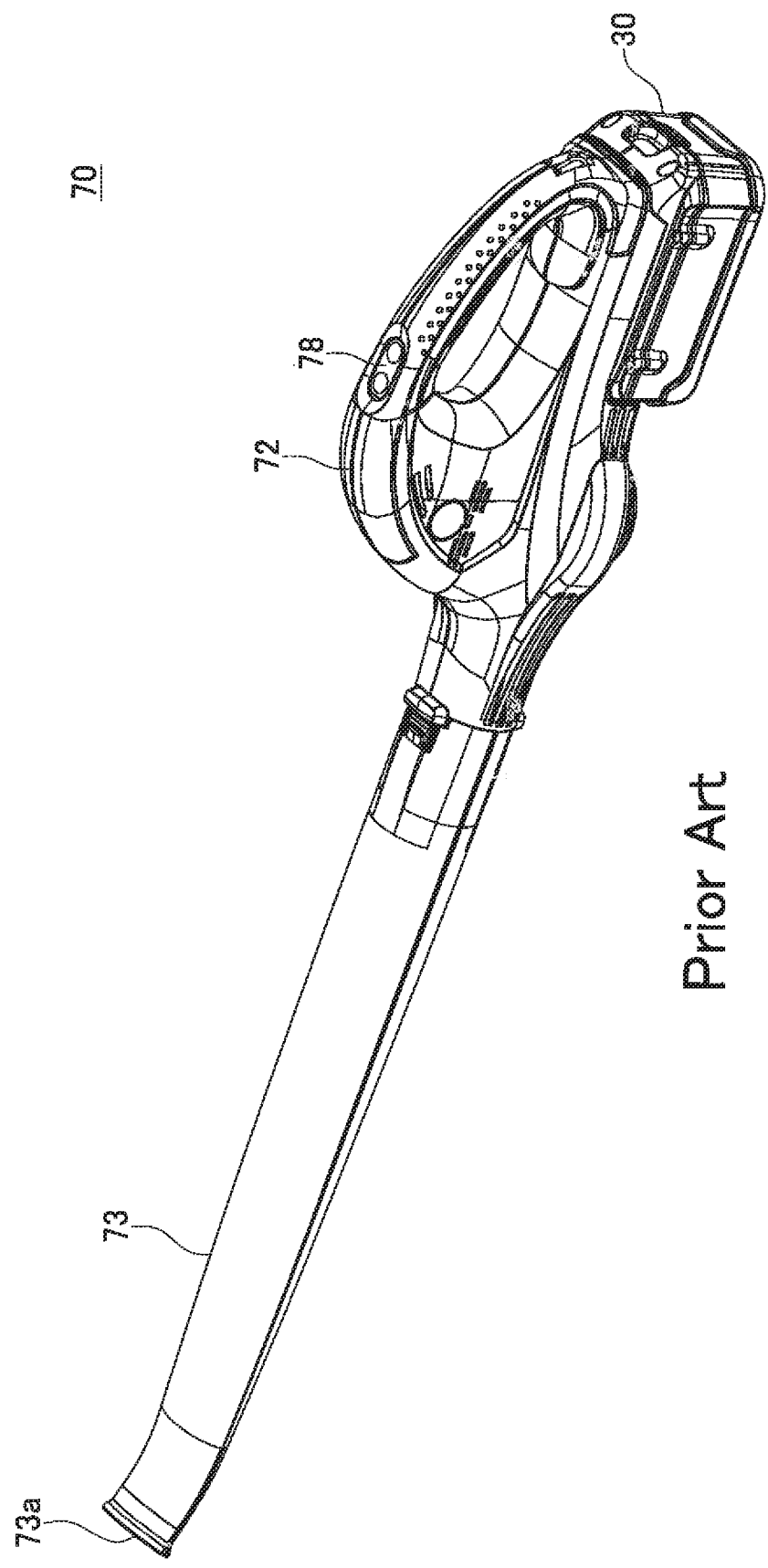
FIG. 20 shows a known high-voltage electric tool having one high-voltage battery pack as a power source.

The two types of high-voltage electric tools 70, 100 will be explained below. The first high-voltage electric tool 70 is designed to be normally operated using one high-voltage battery pack 30 as the sole power source, as will now be explained with reference to FIGS. 20, 21, and 22. The high-voltage electric tool 70 may be, e.g., an electric blower that includes a blower fan disposed in the main body 72 that is rotatably driven in response to the operation of a main switch 78. The electric blower 70 is an electric power tool normally used for gardening and cleaning-up purposes by propelling air from a tip 73a of a nozzle 73 to move debris, such as dead leaves. The high-voltage electric tool 70 operating at a nominal voltage of 36 volts has already been put to practical use together with the high-voltage battery pack 30 that outputs a nominal voltage of 36 volts.

Figure 22:
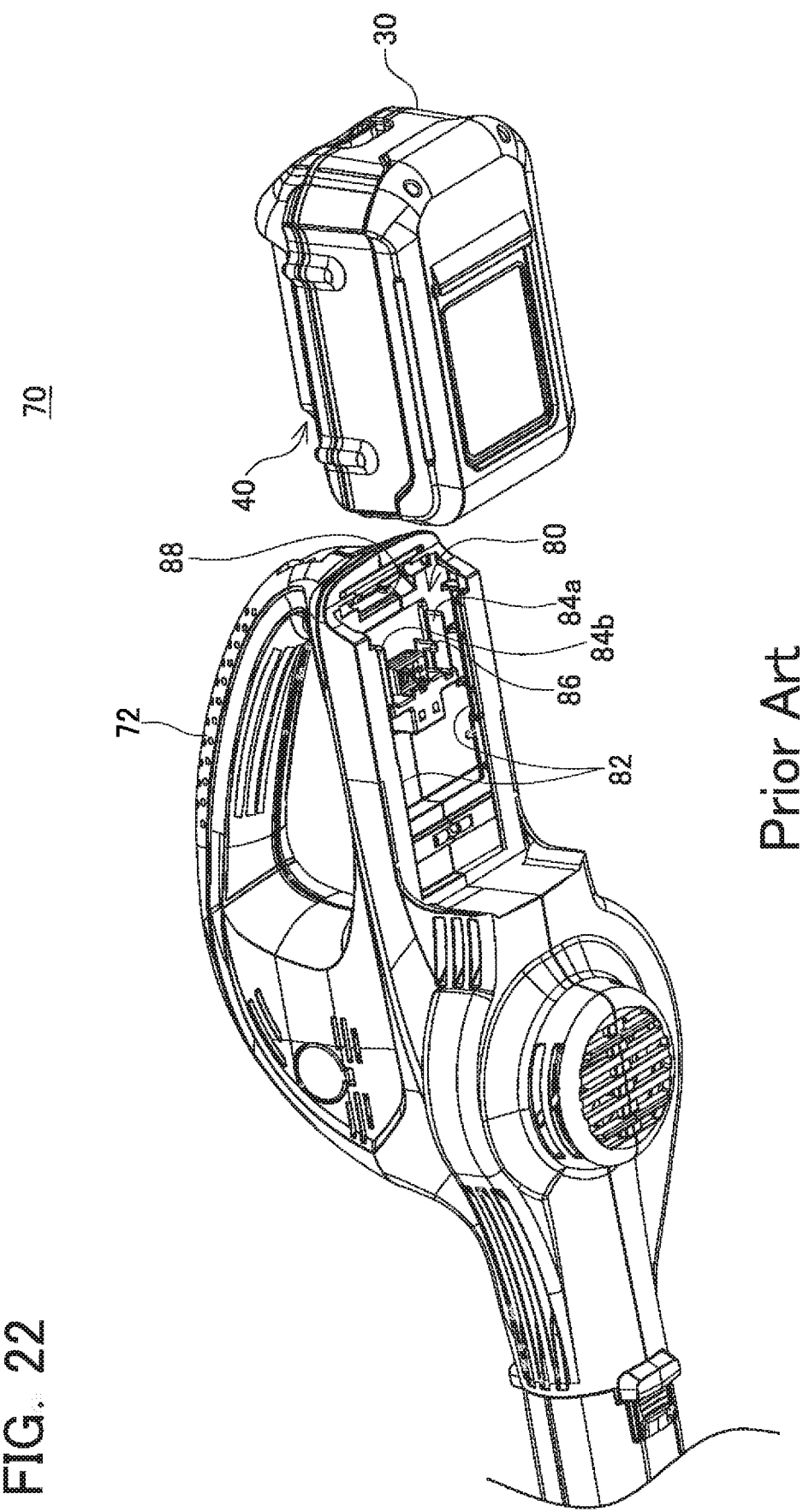
FIG. 22 is a bottom view illustrating the high-voltage battery pack detached from the main body of the high-voltage electric tool.

Referring to FIG. 22, the main body 72 of the high-voltage electric tool 70 has one battery interface 80. The battery interface 80 is configured to removably attach to the high-voltage battery pack 30, and the high-voltage battery pack 30 can be slidably received therein. The battery interface 80 includes a pair of rails 82, a positive electrode input terminal 84a, a negative electrode input terminal 84b, a battery controller input/output terminal 86 and a latch receiving hole 88.

Figure 21:
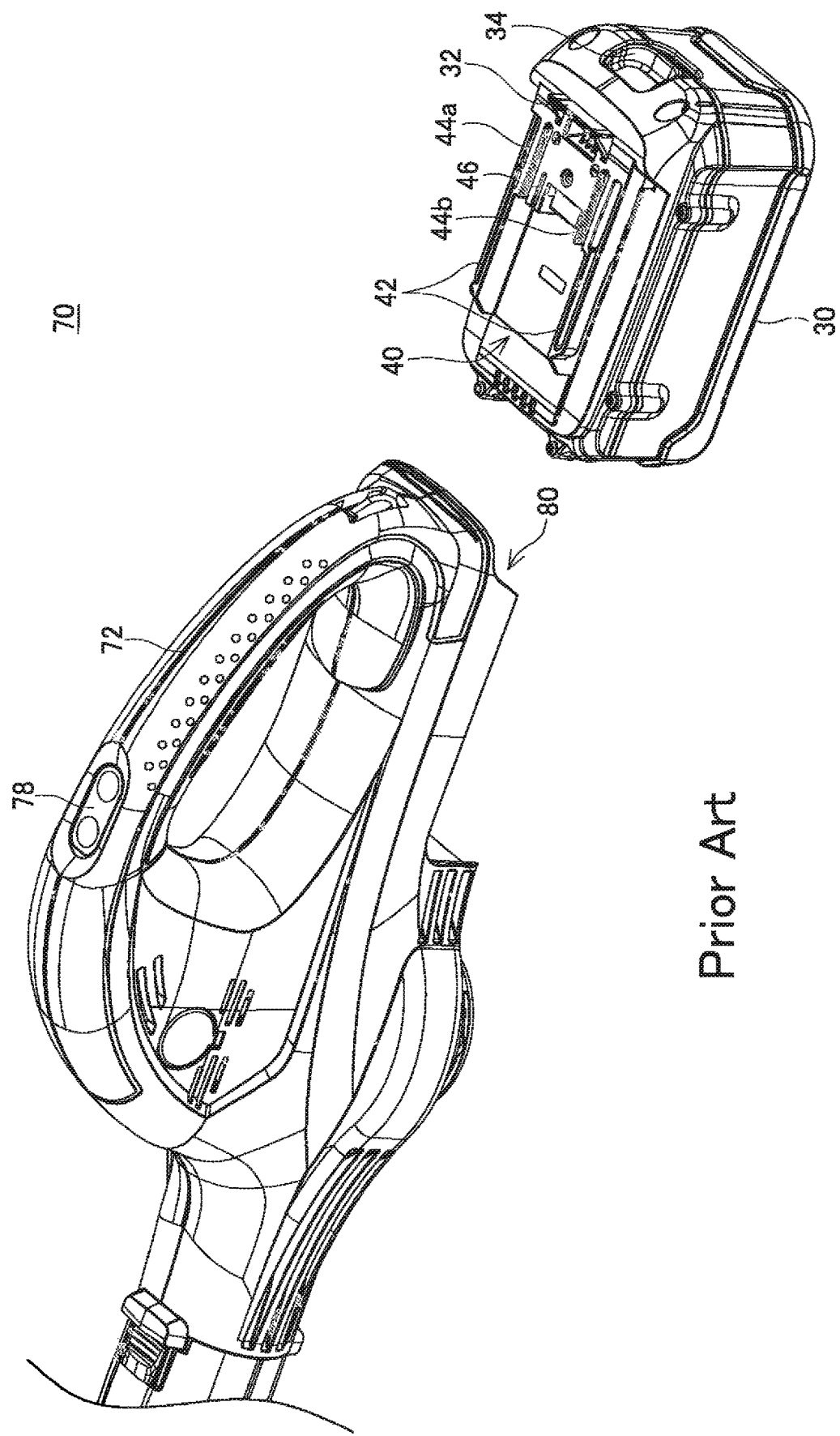
FIG. 21 is a top view illustrating the high-voltage battery pack detached from the main body of the high-voltage electric tool.

The high-voltage battery pack 30 includes a connector 40 that can be slidingly inserted into the battery interface 80, as shown in FIG. 21. The connector 40 includes a pair of rails 42, a positive electrode output terminal 44a, a negative electrode output terminal 44b, and an autostop terminal 46. When the high-voltage battery pack 30 is attached to the battery interface 80, the positive electrode output terminal 44a of the high-voltage battery pack 30 is connected to the positive electrode input terminal 84a of the battery interface 80, and the negative electrode output terminal 44b of the high-voltage battery pack 30 is connected to the negative electrode input terminal 84b of the battery interface 80. Further, the autostop terminal 46, which is electrically connected to a controller of the battery pack 30 as will be discussed further below, is connected to the battery controller input/output terminal 86. As a result, the high-voltage battery pack 30 is electrically connected to the circuitry inside the main body 72 of the high-voltage electric tool 70. Further, the high-voltage battery pack 30 has a latch member 32 that engages with the latch receiving hole 88 of the battery interface 80 and detachable affixes the high-voltage battery pack 30 to the battery interface 80. The latch member 32 can be released from the latch receiving hole 88 by operating a latch release button 34.

The connectors 20, 40 of the low-voltage battery pack 10 and the high-voltage battery pack 30 may have basically the same or similar structures. However, the sizes of the connectors 20, 40 may differ, e.g., the spacing between the rails 22, 42 may differ. In this case, the low-voltage battery pack 10 cannot be attached to the battery interface 80 of the high-voltage electric tool 70, and the high-voltage battery pack 30 cannot be attached to the battery interface 60 of the low-voltage electric tool 50. In other words, due to the size differences in the connectors 20, 40, the battery interface 80 is a dedicated interface for the high-voltage battery pack 30, and the battery interface 60 is a dedicated interface for the low-voltage battery pack 10. Further, in another embodiment, the interfaces 60, 80 may be dedicated, in addition or in the alternative, based upon differences in the shapes of the connectors 20, 40.

Figure 2:
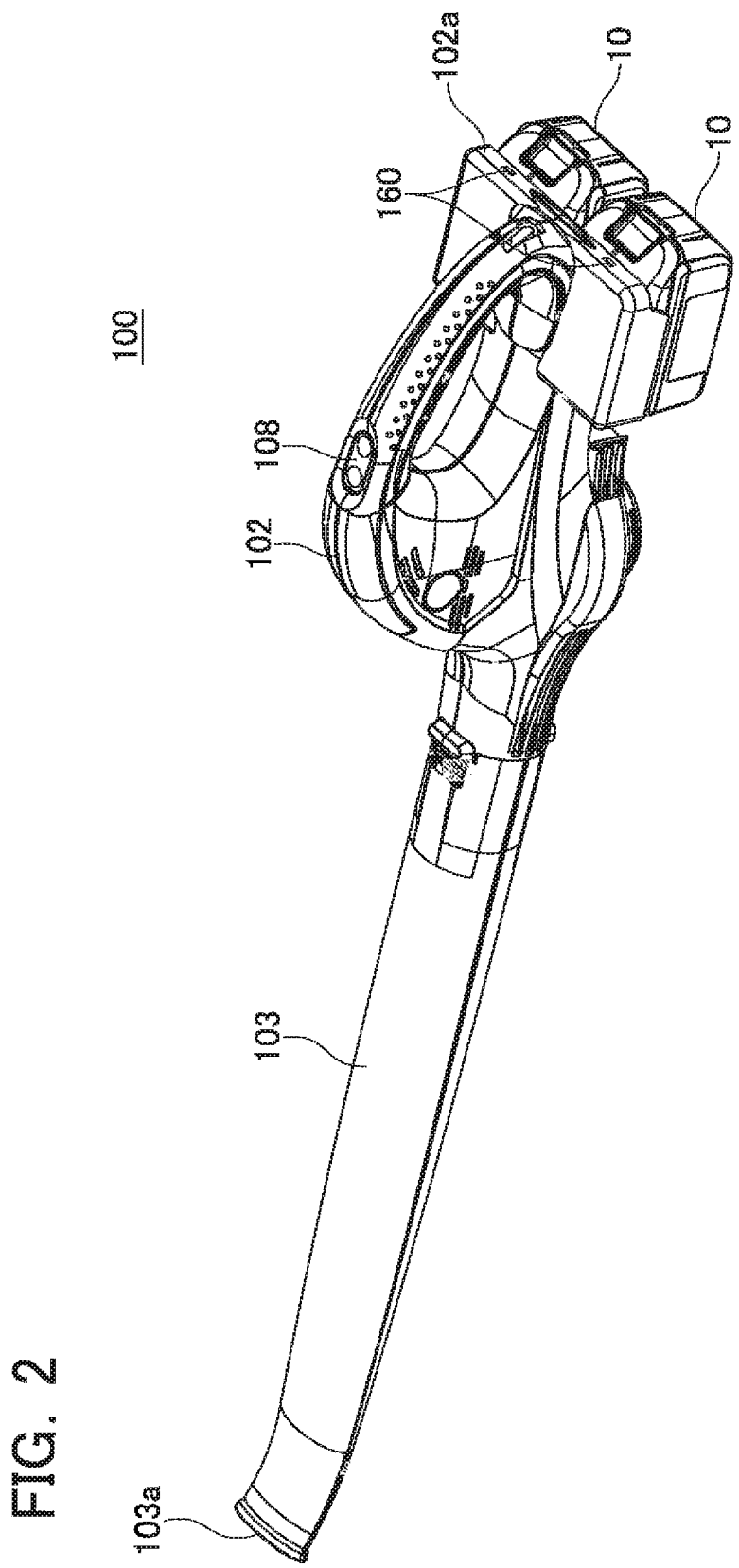
FIG. 2 shows a high-voltage electric power tool that simultaneously uses two low-voltage battery packs as a power source.
Figure 3:
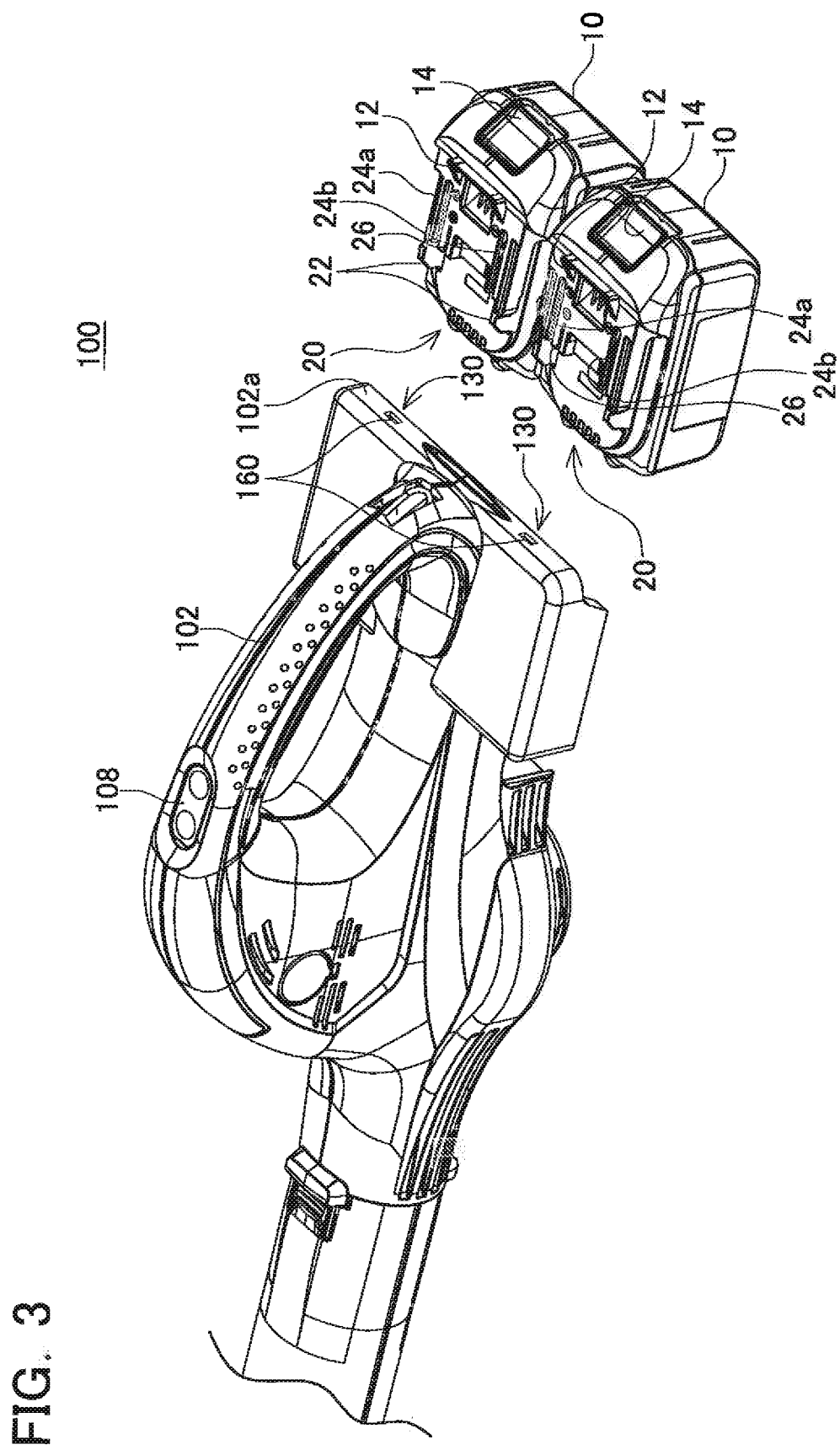
FIG. 3 is a top view illustrating the two low-voltage battery packs detached from the main body of the high-voltage electric tool of FIG. 2.
Figure 4:
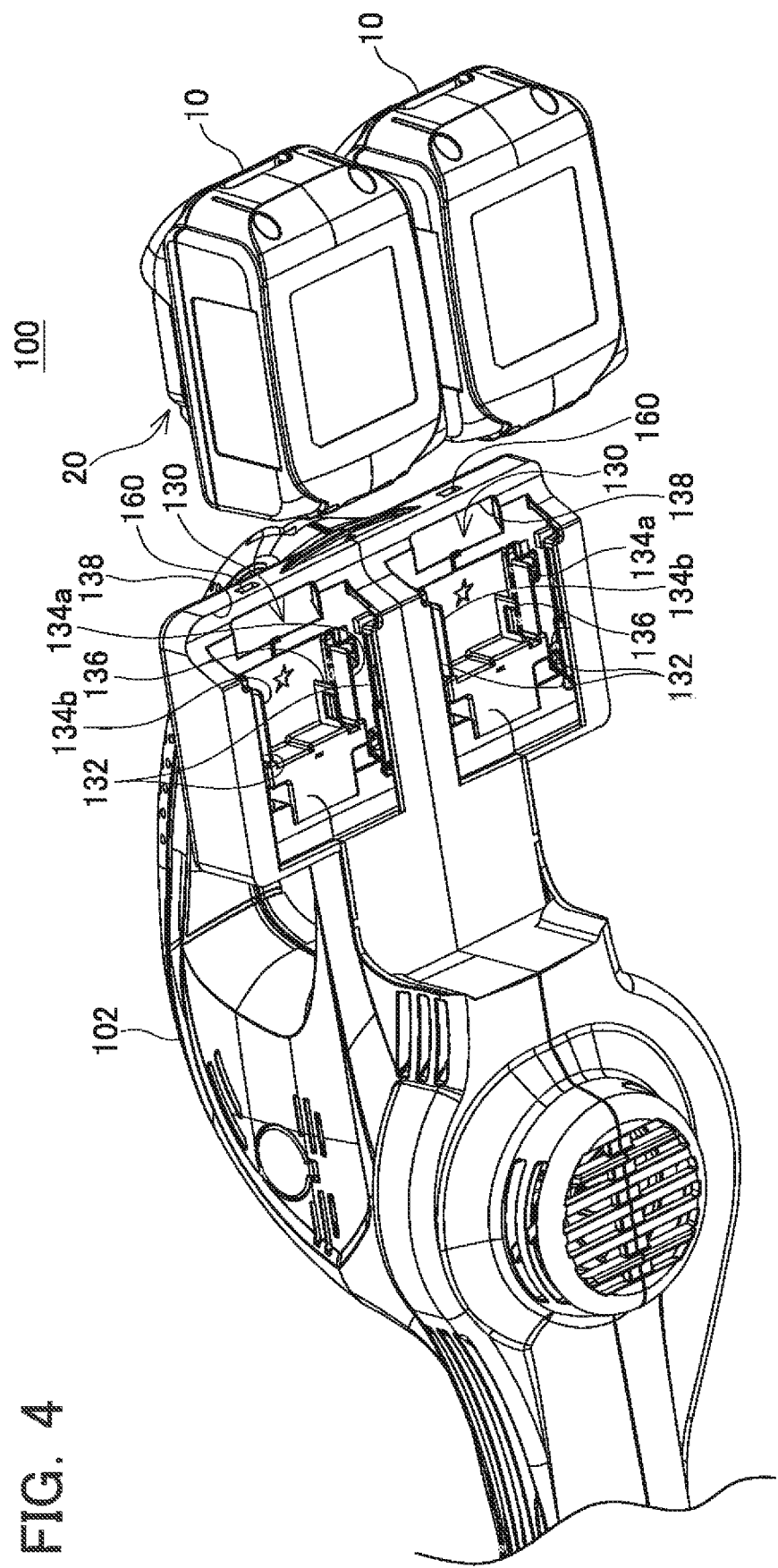
FIG. 4 is a bottom view illustrating the two low-voltage battery packs detached from the main body of the high-voltage electric tool of FIG. 2.

Referring now to FIGS. 2-4, the second high-voltage electric tool 100 is designed to be normally operated, on the other hand, by simultaneously using two low-voltage battery packs 10 as its power source. The high-voltage electric tool 100 also may be an electric blower having a blower fan rotatably supported in a main body 102 that is driven in response to the operation of a main switch 108. The electric blower 100 is basically identical to the above-described electric blower 70 in terms of functions and applications thereof.

In order to utilize current simultaneously supplied from two battery packs 10, the main body 102 of the high-voltage electric tool 100 includes two battery interfaces 130. Each battery interface 130 is configured to removably and, e.g., slidably, receive or attach one low-voltage battery pack 10. Each battery interface 130 includes a pair of rails 132, a positive electrode input terminal 134a, a negative electrode input terminal 134b, a battery controller input/output terminal 136 and a latch receiving hole 138. The battery interface 130 is substantially identical to the battery interface 60 of the above-described low-voltage electric tool 50 in terms of the respective structures. The two battery interfaces 130 are arranged side by side in the rear portion of the main body 102, and the low-voltage battery packs 10 can be inserted in the same direction. The two low-voltage battery packs 10 attached to the two battery interfaces 130 are connected in series and supply current to the circuitry of the main body 102 at about 36 volts.

The main body 102 of the high-voltage electric tool 100 also includes two indicators 160 respectively positioned above the two battery interfaces 130. Each indicator 160 comprises, e.g., one or more light-emitting diodes, or another means for visually communicating battery condition information to the tool user, such as but not limited to one or more incandescent lamps and/or a display, such as an LCD. In a preferred embodiment, one of the indicators 160 may indicate a charge state or level of charge of the low-voltage battery pack 10 attached to one battery interface 130, and the other indicator 160 may indicate the same condition (i.e. level of charge) or another condition of the low-voltage battery pack 10 attached to the other battery interface 130. More preferably, both indicators 160 indicate the charge state or the level of charge of the corresponding low-voltage battery pack 10. For example, the light-emitting diode can be illuminated when the charge state drops to a level at which recharging of the battery pack 10 is necessary. It is further preferred that each indicator 160 indicates the charge state of its corresponding low-voltage battery pack 10 at least in two levels, e.g., a yellow "low-charge warning" and red "immediately stop tool use" indication. A third green "tool operation permitted" LED also may be optionally provided, so that the tool user can receive visual confirmation that the battery is in a suitable condition for use. It is also preferred that one or more indicators 160 communicate information concerning a possible battery temperature abnormality (e.g., overheating) of the corresponding low-voltage battery pack 10, instead of or in addition to the charge state of the corresponding low-voltage battery pack 10.

As shown in FIG. 2, the two indicators 160 are arranged side by side on a rear surface 102a of the high-voltage electric tool 100 and have the same indication direction (that is, the direction of illumination of the two light-emitting diodes is the same or substantially the same). Therefore, the user can see both indicators 160 simultaneously and can simultaneously recognize the respective charge states of the two low-voltage battery packs 10 in a convenient and reliable manner. Further, the indicators 160 are disposed above the corresponding battery interfaces 130. Therefore, for example, if the high-voltage electric tool 100 abruptly stops, the user can immediately and conveniently determine which of the low-voltage battery packs 10 has experienced a problem or abnormality. In addition or in the alternative to the rear surface 102a, the two indicators 160 could be disposed in other locations that can be simultaneously viewed by the user, such as an upper surface of the main body 102. More particularly, it is preferred that the two indicators 160 are disposed generally in the same plane, so that the user can simultaneously see the two indicators 160 from various different directions.

In addition or in the alternative, one or more indicators 160 can be also provided on an outer surface of each low-voltage battery pack 10, e.g. a surface of the battery pack 10 that faces rearward when the battery pack 10 is attached to the tool 100. As was already explained above, it is preferred that the two battery interfaces 130 are arranged side by side and can slidably receive the low-voltage battery packs 10 in the same direction. In such an embodiment, when the two low-voltage battery packs 10 are attached to the main body 102, the two indicators 160 will be positioned side by side in the same plane and the indication or illumination direction thereof will also be the same or substantially the same. As a result, even if the indicators 160 are disposed on the respective battery packs 10, the user can simultaneously view the two indicators 160 from various different directions.

Figure 5:
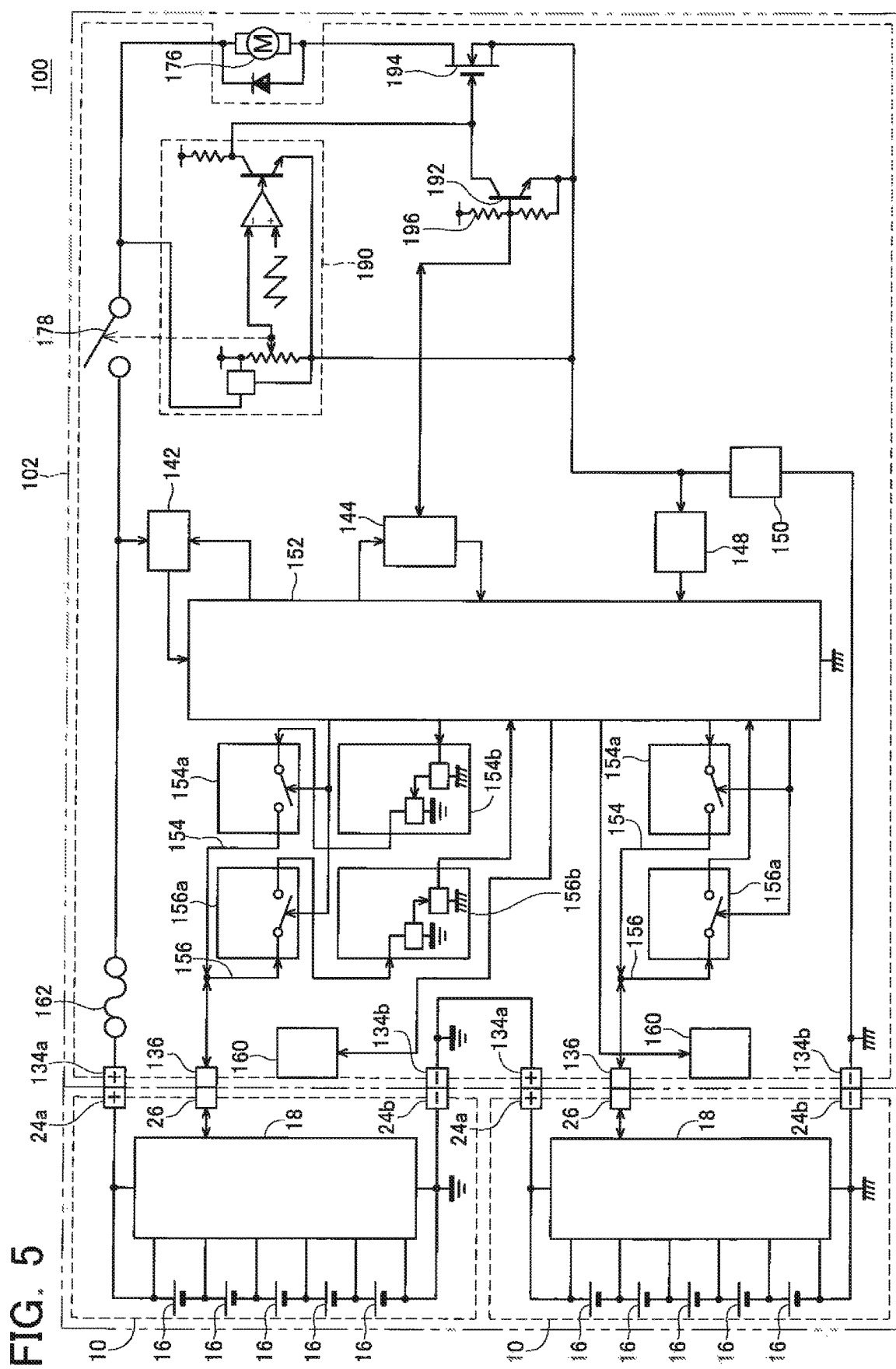
FIG. 5 is a schematic circuit diagram illustrating an electric circuit of the high-voltage electric tool of FIG. 2.

An exemplary electric circuit for the high-voltage electric tool 100, as well as for the two low-voltage battery packs 10 serving as the power source for the tool 100, will be explained below with reference to FIG. 5. Each low-voltage battery pack 10 comprises five battery cells 16 connected in series and a battery controller 18, preferably a microprocessor. Each cell 16 is preferably a lithium-ion cell and the nominal voltage thereof is 3.6 volts. The five cells 16 connected in series are connected to the positive electrode output terminal 24a and negative electrode output terminal 24b, and current can flow across the two terminals 24a, 24b at a voltage of about 18 volts. As shown in FIG. 5, the negative electrode output terminal 24b of the upper low-voltage battery pack 10 is electrically connected to the positive electrode output terminal 24a of the lower low-voltage battery pack 10 via the terminals 134a and 134b, which are conductively connected by a wire. As a result, when the two low-voltage battery packs 10 are connected to the respective battery interfaces 130, the battery cells 16 of the two low-voltage (18 volt) battery packs 10 are connected in series and supply current to the circuitry of the main body 102 at a voltage of about 36 volts.

The battery controller 18 preferably comprises an integrated circuit that includes a CPU and can execute various programs stored therein. The battery controller 18 is electrically connected to each cell 16 and can measure the voltage of each cell 16. The battery controller 18 may be programmed to perform an algorithm, wherein the controller 18 determines the charge state or level of charge of each cell 16 based on the measured voltage of each cell 16, compares the measured voltage to a predetermined, stored threshold value and then outputs an autostop signal (AS signal) to the autostop terminal 26 when at least one cell 16 is determined to require recharging based upon the comparison step. In this case, the autostop signal may be a signal, e.g., indicating that a high impedance has been detected. In this embodiment, and all other embodiments disclosed herein, the autostop signal may preferably be a digital logic signal that is selected from one of two different voltage levels, i.e. a "1" or "0" digital signal that has a distinctly different voltage level signal as compared to a "battery normal" signal. However, it is also contemplated that the battery controller 18 may be an analog circuit or a mixed analog/digital circuit (e.g., a state machine) and the battery controller 18 may output analog signals (e.g., signals having more than two voltage levels) as the autostop signal. Naturally, the battery controller 18 is not limited to outputting only "autostop" signals, but may also be configured or programmed to output a wide variety of signals, e.g., representing one or more conditions of the battery, such as battery temperature, battery voltage, battery impedance, etc.

The main body 102 is provided with a motor 176 that drives the tool (in this exemplary embodiment, a blower fan). The two low-voltage battery packs 10 are connected in series with the motor 176 via a main switch 178. The main body 102 is provided with a speed adjusting circuit 190, a power FET 194, a gate-voltage-controlling transistor 192, and a voltage division circuit 196. The power FET 194 is connected in series with the motor 176 and can shut off the electric current flowing to the motor 176. The speed adjusting circuit 190 performs pulse width modulation control for controlling the current flow through the power FET 194 and thus can adjust the rotational speed of the motor 176 in a manner well known in the power tool field. The gate-voltage-controlling transistor 192 is connected to the gate of the power FET 194 and, together with the voltage division circuit 196, can control the gate voltage of the power FET 194.

The main body 102 is also provided with a main controller 152, a power supply circuit 142 for the main controller 152, a shunt resistor 150 connected in series with the motor 176, a current detection circuit 148 that detects the electric current flowing to the motor 176 based on the voltage of the shunt resistor 150, and an autostop signal (AS signal) input/output circuit 144 that inputs/outputs autostop signals to/from the gate-voltage-controlling transistor 192.

The main controller 152 is preferably an integrated circuit including a CPU and can execute various programs stored therein. For example, the main controller 152 may be programmed to perform the following algorithm. After receiving a voltage signal outputted by a current detection circuit 148 as an input signal, the main controller 152 compares the voltage signal to a pre-set, stored threshold/permissible value and then outputs an autostop signal to the gate-voltage-controlling transistor 192 via the autostop signal input/output circuit 144 when the electric current of the motor 176 exceeds the pre-set permissible value. In this case, the gate-voltage-controlling transistor 192 decreases the voltage coupled to the gate of the power FET 194 to the ground voltage, thereby shutting off the power FET 194. As a result, the motor 176 and the low-voltage battery pack 10 are electrically disconnected and an overload of the motor 176 and the low-voltage battery pack 10 may be prevented. A fuse 162 for preventing an excessive current from flowing between the motor 176 and the low-voltage battery pack 10 may also optionally be provided in the circuit path between the motor 176 and the low-voltage battery pack 10.

The main controller 152 is electrically connected to the battery controller input/output terminal (hereinafter "autostop terminal") 136 of the battery interface 130 and can receive a signal voltage (for example, an autostop signal) from the battery controller 18 as an input signal and can output a signal voltage (for example, a discharge protection cancellation signal) to the battery controller 18. In this case, because two low-voltage battery packs 10 are connected in series, the reference voltages (ground voltages) of the two low-voltage battery packs 10 differ from each other. More specifically, whereas the reference voltage of the low-voltage battery pack 10 positioned at the low-voltage side (lower side in FIG. 5) will be referred to as a zero volt ground, the reference voltage of the low-voltage battery pack 10 positioned at the high-voltage side (upper side in FIG. 5) is 18 volts due to the series connection via terminals 24a, 134a, 134b, 24b. The reference voltage of the main body 102 is equal to the reference voltage of the low-voltage battery pack 10 at the low-voltage side and is thus also zero volts. As a result, the levels of the inputted and outputted signal voltages differ significantly between the main controller 152 of the main body 102 and the battery controller 18 of the upper low-voltage battery pack 10 positioned at the high-voltage side. Consequently, the signal voltages cannot be directly inputted and outputted between the controllers 18, 152 unless a conversion (e.g., a step-down, step-up or other voltage level shift) of the signal voltages is first performed.

To overcome this problem, the high-voltage electric tool 100 of the present embodiment also includes two voltage level-shifters (e.g., DC-to-DC converters) 154b, 156b provided between the battery controller 18 of the low-voltage battery pack 10 positioned at the high-voltage side and the main controller 152 of the main body 102. One level-shifter 154b is provided on a conductive path 154 that conducts a signal voltage from the main controller 152 to the battery controller 18 and raises, preferably proportionally raises, the level of the signal voltage outputted by the main controller 152 to an acceptable or readable level for the battery controller 18. The other level-shifter 156b is provided on a conductive path 156 for conducting a signal voltage from the battery controller 18 to the main controller 152 and lowers, preferably proportionally lowers, the level of the signal voltage outputted by the battery controller 18 to an acceptable or readable level for the main controller 152. As a result, signals can be communicated (i.e. input and output) between the battery controller 18 and the main controller 152 without any problem caused by the different ranges of voltages at which the two controllers 18, 152 operate.

Further, cut-off switches 154a, 156a are also provided between each battery controller 18 and the main controller 152. One cut-off switch 154a is provided on the conductive path 154 for conducting the signal voltage from the main controller 152 to the battery controller 18, and the other cut-off switch 156a is provided on the conductive path 156 for conducting a signal voltage from the battery controller 18 to the main controller 152. The cut-off switches 154a, 156a are controlled by the main controller 152. When the main controller 152 determines that the high-voltage electric tool 100 has not been used for a predetermined time, the main controller 152 switches off the cut-off switches 154a, 156a, thereby electrically disconnecting the battery controllers 18 from the main controller 152. As a result, leakage current is prevented from flowing for too long of a time between the battery controllers 18 and the main controller 152, thereby preventing the low-voltage battery pack 10 from being excessively discharged. The cut-off switches 154a and 156b are electrically connected between the main controller 152 and respective battery controllers 18 via the respective wires 154, 156, through which a leakage current may flow.

It should be understood that the arrangement of the cut-off switch(es) of the present teachings is not limited to the arrangement shown in the present embodiment. For example, if there are a plurality of wires, through which a leakage current may possibly flow between the main controller 152 and one battery controller 18, the cut-off switch(s) may be provided in one or some, but not all, of the conductive paths. In another alternative embodiment, in which a plurality of battery packs is connected to the main controller, the cut-off switch(es) may be provided between the main controller 152 and only one or some of the battery packs (e.g., only the first battery pack #1 or the second battery pack #2).

As described hereinabove, when the charge state of the cells 16 is detected as having decreased below a predetermined threshold, the battery controller 18 outputs an autostop signal to the autostop terminal 26, which is electrically connected to the autostop terminal 136. The autostop signal outputted from the battery controller 18 is input into the main controller 152 via the conductive path 156. The main controller 152 receives the autostop signal from the battery controller 18 and outputs an autostop signal to the gate-voltage-controlling transistor 192. In this case, the autostop signal outputted by the main controller 152 is conducted to the gate of the gate-voltage-controlling transistor 192 via an autostop signal input/output circuit 144. As a result, the gate-voltage-controlling transistor 192 is turned on (i.e. becomes conductive), the power FET 194 is shut off, and current supply to the motor 176 is stopped. The low-voltage battery pack 10 is thus prevented from being over or excessively discharged.

In addition, when the main controller 152 receives the autostop signal from the battery controller 18, the indicator (LED of indication circuit) 160 is preferably illuminated. In this case, the main controller 152 selectively illuminates only the indicator 160 corresponding to the low-voltage battery pack 10 that has outputted the autostop signal. As a result, the user can immediately determine which low-voltage battery pack 10 requires charging.

As described hereinabove, the high-voltage electric tool 100 has two battery interfaces 130 configured to removably receive respective low-voltage battery packs 10 and can simultaneously use two low-voltage battery packs 10 as the power source. The two low-voltage battery packs 10 are connected in series to the motor 176 and supply a voltage of 36 volts to the motor 176. Thus, the high-voltage electric tool 100 with a rated voltage of 36 volts is driven by two low-voltage battery packs 10, each having a nominal voltage of 18 volts. The user can power the high-voltage electric tool 100 by using already available low-voltage battery packs 10, without having to purchase the high-voltage battery pack 30 and a charger therefor. Each low-voltage battery pack 10 also can be used individually as a sole power source for the low-voltage electric tool 50. Therefore, the user can effectively use the already available low-voltage battery packs 10 and the battery charger therefor.

Figure 6:
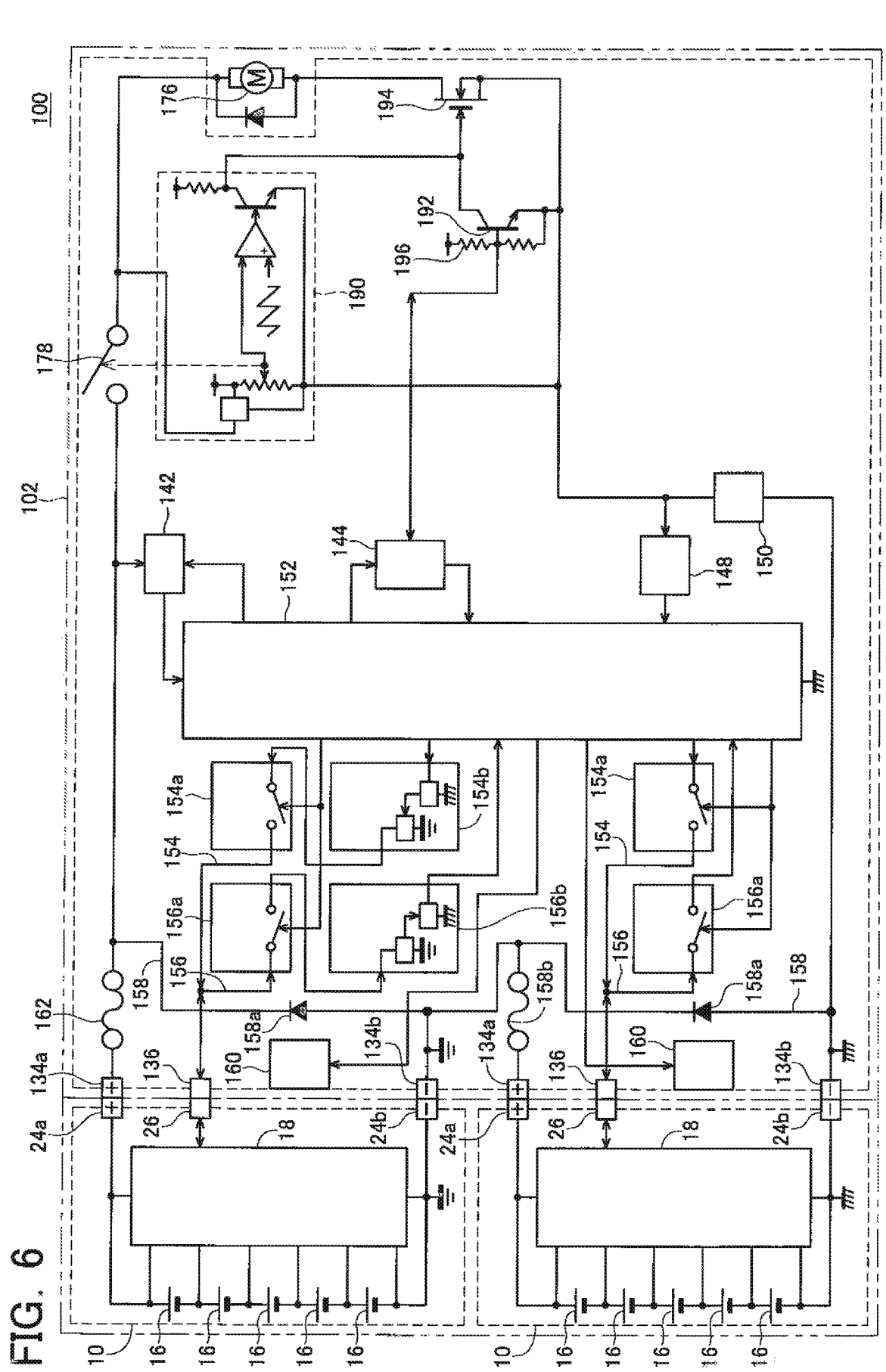
FIG. 6 is a modified example of the electric circuit of FIG. 5 having a bypass circuit added thereto.

FIG. 6 illustrates an example in which the electric circuit of the high-voltage electric tool 100 has been modified. In this modified example, two bypass circuits 158 are added to the circuit shown in FIG. 5. One bypass circuit 158 is provided for each respective low-voltage battery pack 10 connected with the main controller 152. Each bypass circuit 158 connects the positive electrode input terminal 134a with the negative electrode input terminal 134b for one battery pack 10 via a diode 158a. Thus, the bypass circuit 158 connects the positive electrode output terminal 24a with the negative electrode output terminal 24b of each low-voltage battery pack 10 via the diode 158a. In this embodiment, one bypass circuit 158 is provided for each of the battery packs 10 connected with the main controller 152. Note that the arrangement of the bypass circuit(s) of the present teachings is/are not limited to the above embodiment. For example, the bypass circuit may be provided between only some of the battery packs (e.g., only the first battery pack #1 or the second battery pack #2).

The anode of the diode 158a is connected to the negative electrode input terminal 134b, and the cathode of the diode 158a is connected to the positive electrode input terminal 134a. Therefore, electric current normally does not flow in the diode 158a, and the positive electrode output terminal 24a and the negative electrode output terminal 24b of the low-voltage battery pack 10 are electrically disconnected. However, when the low-voltage battery pack 10 becomes over-discharged and a reverse voltage is generated across the output terminals 24a, 24b of the low-voltage battery pack 10, electric current is caused to flow in the diode 158a. Thus, the output terminals 24a, 24b of the battery pack 10 become electrically connected via the bypass circuit 158. As a result, even if only one low-voltage battery pack 10 becomes over-discharged, any damage caused to that low-voltage battery pack 10 can be minimized or even prevented. A fuse 158b also may be optionally provided in the bypass circuit 158. In this case, if a large current flows in the bypass circuit 158, the bypass circuit 158 will be physically disconnected by the fuse 158b, which has melted or otherwise broken the connection due to the excessive current. As a result, any damage caused to the low-voltage battery pack 10 can be minimized or prevented, for example, even when Zener breakdown occurs in the diode 158a. The fuse 158b is preferably accessible by the user so that it can be replaced, in case it is broken.

Figure 7:
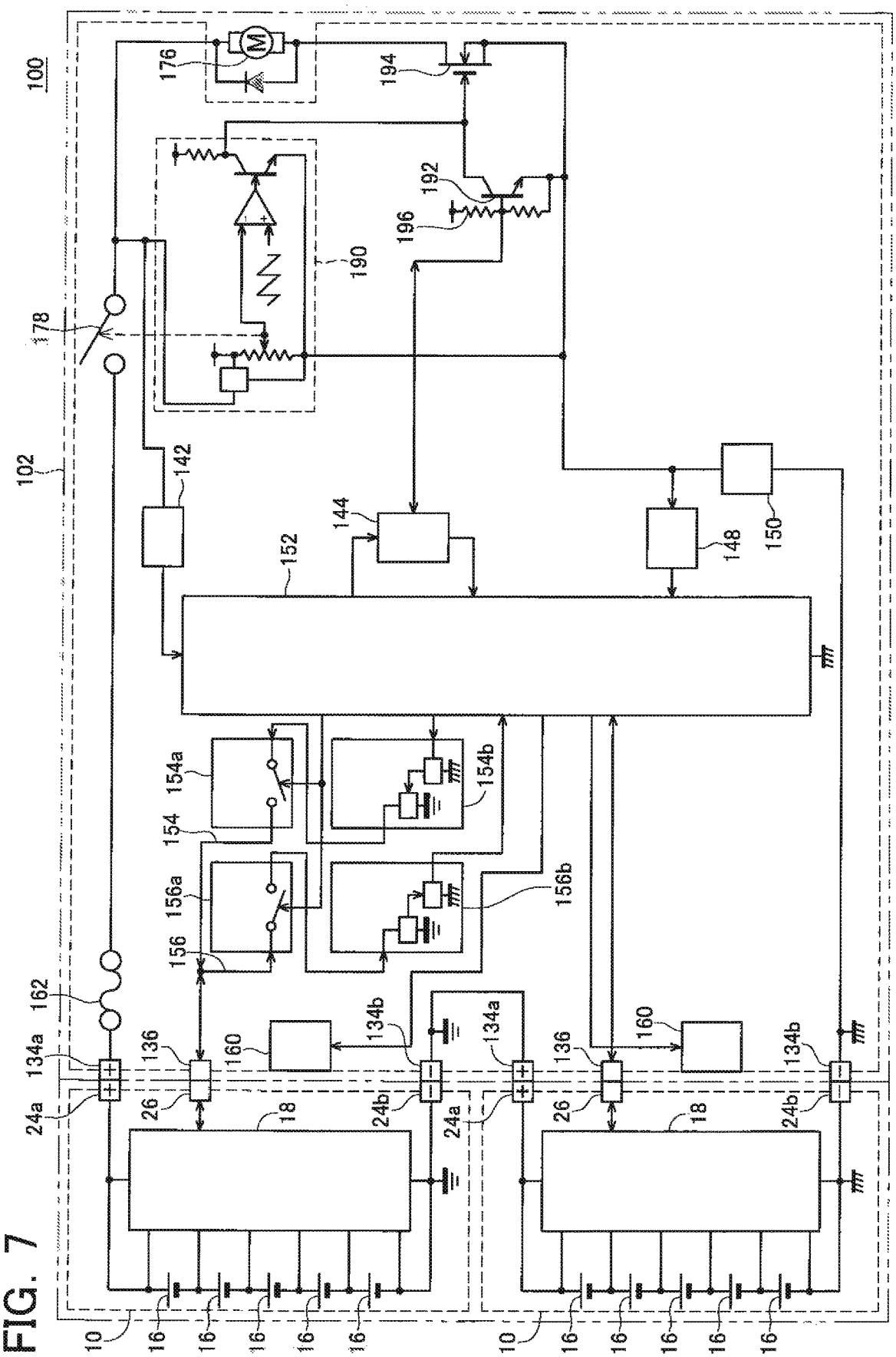
FIG. 7 is a modified example of the electric circuit of FIG. 5, in which the position of the connection to the power supply circuit for the main controller has been changed.

FIG. 7 illustrates another modified example of the electric circuit of the high-voltage electric tool 100. In this modified example, the attachment position of the power supply for the main controller 152 in the circuit shown in FIG. 5 has been changed. As shown in FIG. 7, the main switch 178 is inserted between the low-voltage battery pack 10 and the power supply circuit 142. Thus, when the main switch 178 is switched off, the current flow to the main controller 152 is simultaneously shut off. As a result, the main controller 152 can be prevented from unnecessarily consuming power in an inactive state of the high-voltage electric tool 100.

Figure 8:
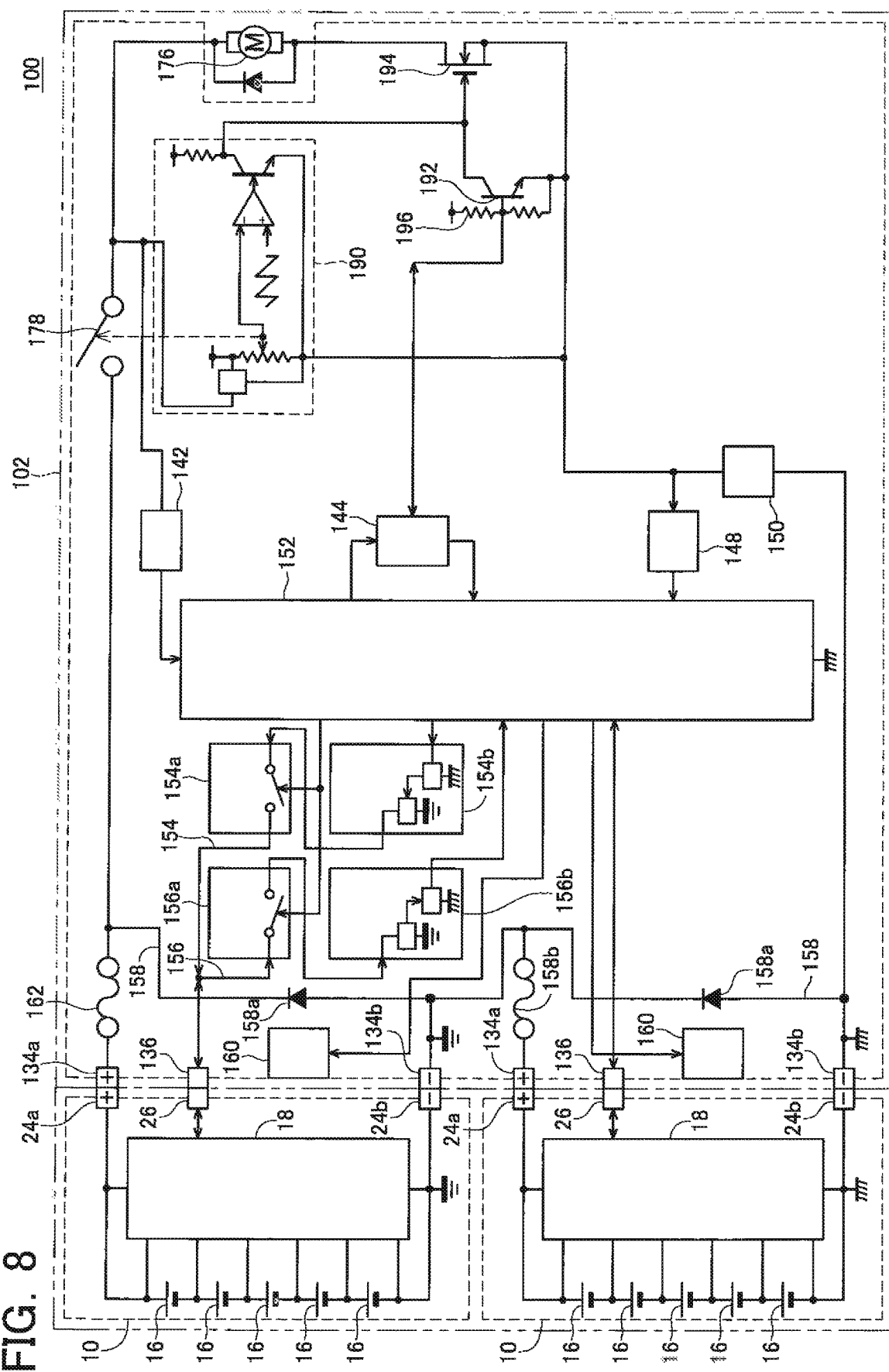
FIG. 8 is a modified example of the electric circuit of FIG. 5, in which the position of the connection to the power supply circuit for the main controller has been changed and the bypass circuit has been added.

FIG. 8 illustrates another modified example of the electric circuit of the high-voltage electric tool 100. In this modified example, two bypass circuits 158 are added to the circuit shown in FIG. 7. The structure, functions, and effect of the bypass circuits 158 are same as described with reference to the embodiment shown in FIG. 6.

Figure 9:
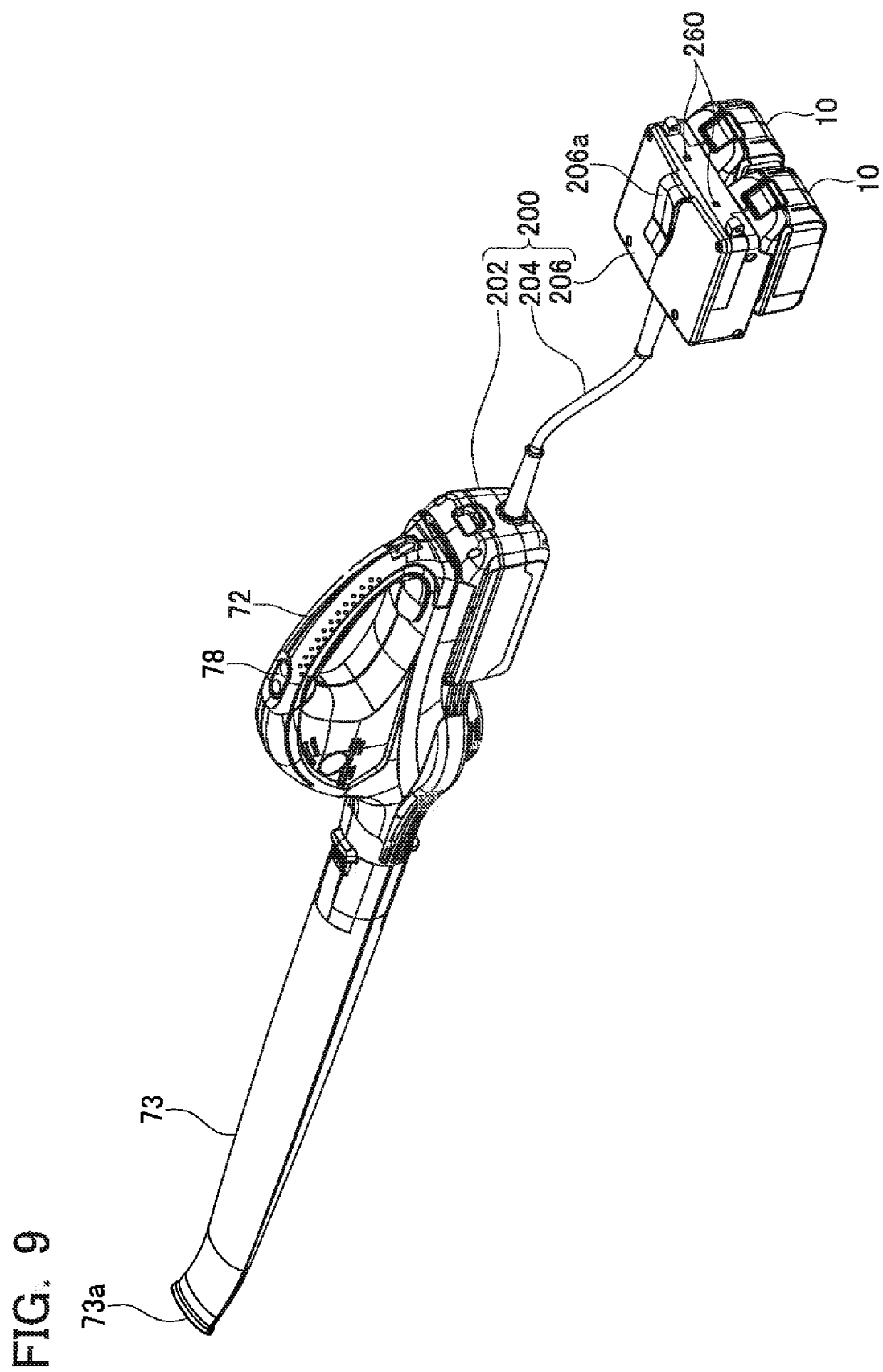
FIG. 9 shows two low-voltage battery packs connected to the main body of a high-voltage electric tool via an adapter having a cord connecting a pack side unit with a main body side unit.

Two types of adapters 200, 300 are also disclosed in the present teachings, namely a corded adapter 200 and an integrated adapter 300. The corded adapter 200 will be explained first with reference to FIGS. 9, 10, and 11. The tool shown in FIGS. 9 and 10 corresponds to the tool 70 shown in FIGS. 19-22, which was described above and is incorporated herein by reference. As shown in FIG. 9, the adapter 200 is configured to connect a plurality of low-voltage battery packs 10 to the high-voltage electric tool 70. The adapter 200 is provided with a main body side unit 202 configured to be detachably attached to the main body 72 of the high-voltage electric tool 70, a pack side unit 206 configured to removably receive or attach a plurality of low-voltage battery packs 10, and an electric cord 204 that physically and electrically connects the main body side unit 202 to the pack side unit 206. An attachment hook 206a optionally may be provided on the pack side unit 206 to enable it to be attached to the user's clothing or belt or another article supported by the user's body, so that the adapter 200 and attached battery packs 10 can be conveniently carried during operation of the tool 70.

Figure 10:
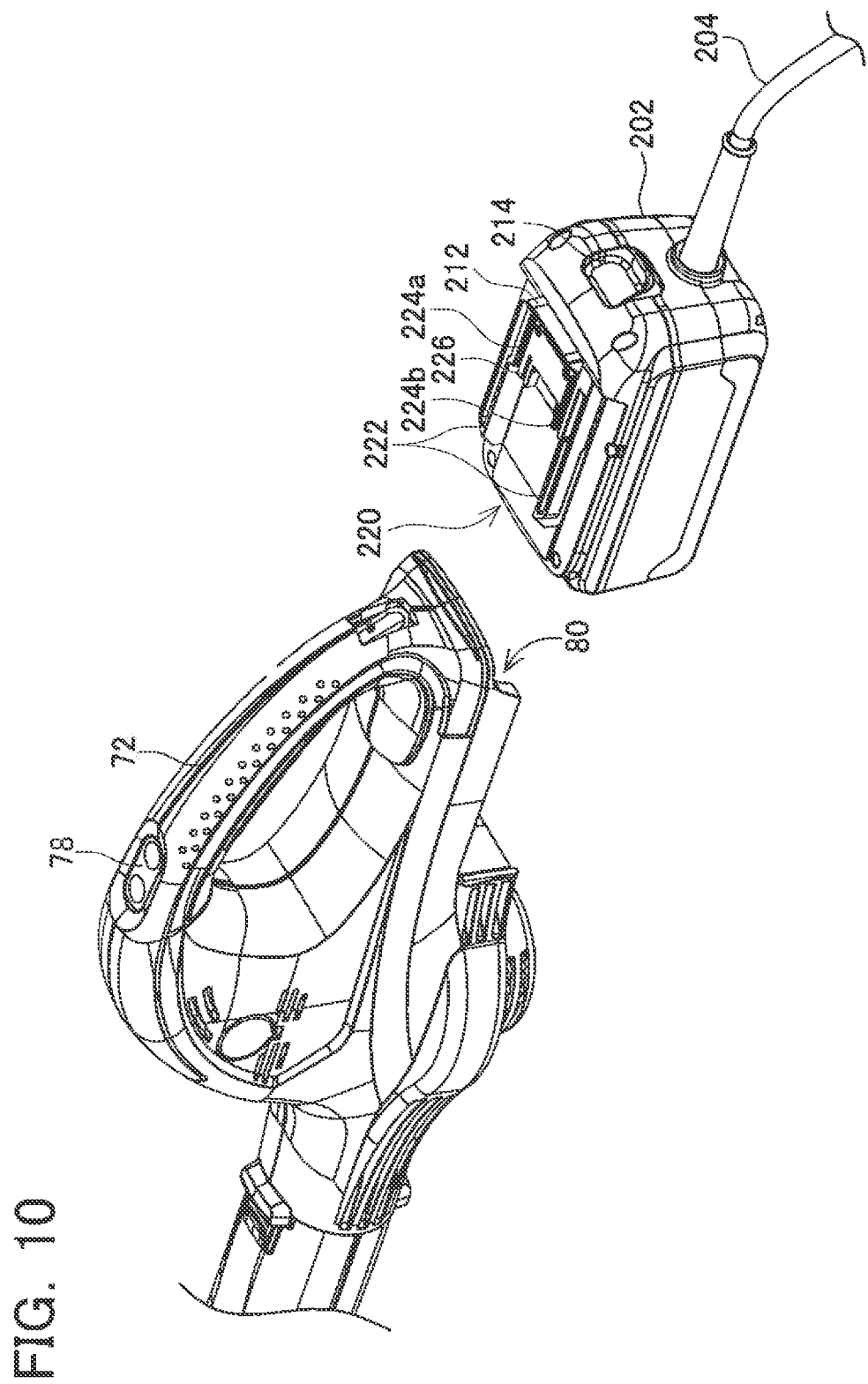
FIG. 10 shows the main body side unit of the adapter of FIG. 9 in greater detail.

As shown in FIG. 10, the main body side unit 202 has an outer contour that generally conforms to the outer contour of the high-voltage battery pack 30. A connector 220 is provided on the main body side unit 202 in the same manner as on the high-voltage battery pack 30. The connector 220 can be slidingly inserted into the battery interface 80 provided on the main body 72 of the high-voltage electric tool 70. The connector 220 includes a pair of rails 222, a positive electrode output terminal 224a, a negative electrode output terminal 224b, and an autostop terminal 226. When the main body side unit 202 is attached to the battery interface 80, the positive electrode output terminal 224a of the main body side unit 202 is connected to the positive electrode input terminal 84a of the battery interface 80, and the negative electrode output terminal 224b of the main body side unit 202 is connected to the negative electrode input terminal 84b of the battery interface 80. Further, the autostop terminal 226 is connected to the battery controller input/output (autostop) terminal 86. As a result, the main body side unit 202 is electrically connected to the internal circuitry of the main body 72 of the high-voltage electric tool 70. Further, the main body side unit 202 has a latch member 212 that is engaged with the latch receiving hole 88 (see FIG. 22) of the battery interface 80 and is configured to detachably affix the main body side unit 202 to the battery interface 80. This engagement of the latch receiving hole 88 with the latch member 212 can be released by the latch release button 214.

Figure 11:
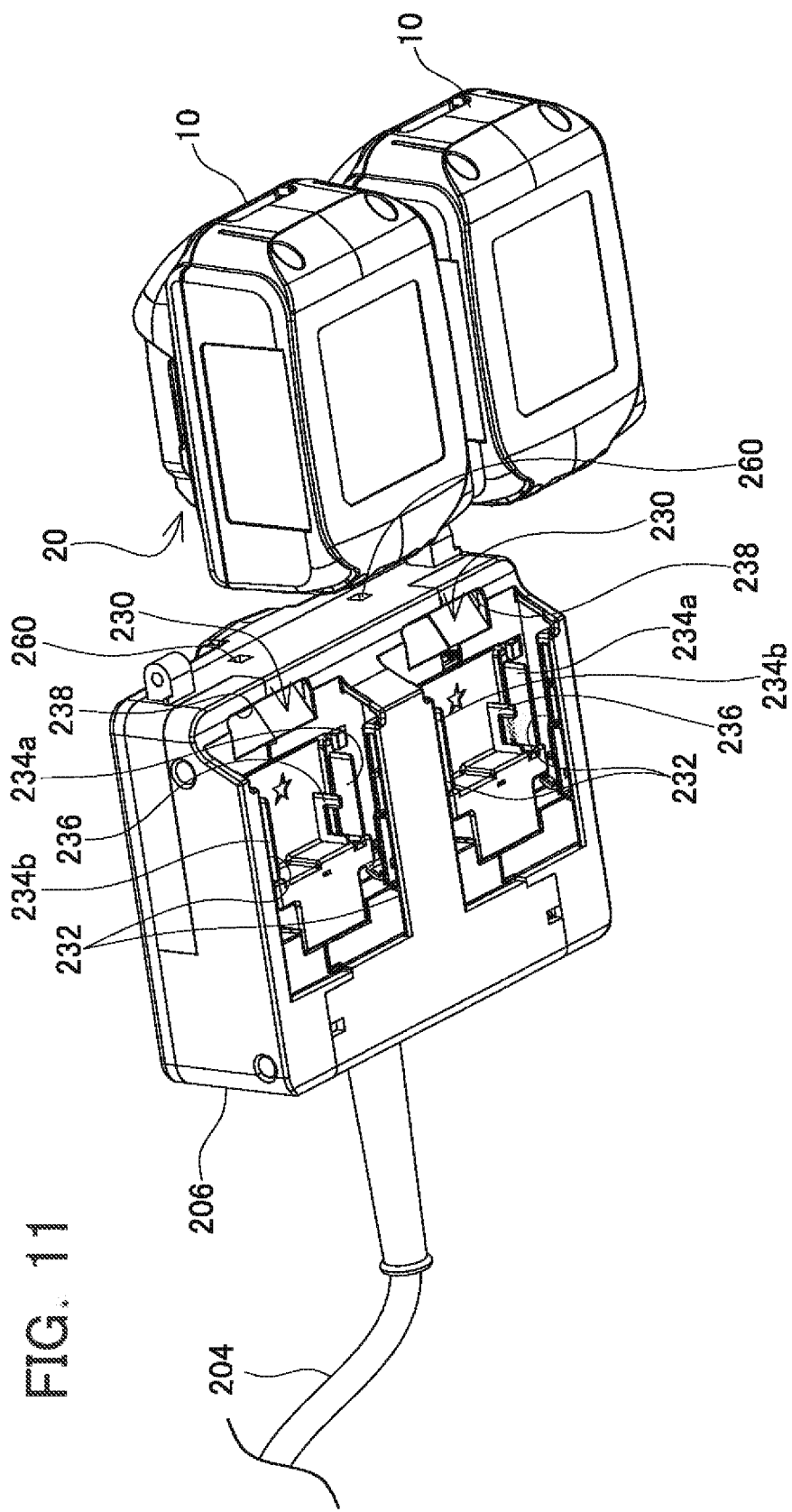
FIG. 11 shows the pack side unit of the adapter of FIG. 9 in greater detail.

As shown in FIG. 11, the pack side unit 206 includes two battery interfaces 230. Each battery interface 230 can removably receive or attach one low-voltage battery pack 10, and the low-voltage battery pack 10 can be slidably received thereby. The battery interface 230 has a pair of rails 232, a positive electrode input terminal 234a, a negative electrode input terminal 234b, a battery controller input/output (autostop) terminal 236 and a latch receiving hole 238. With respect to the structure, the battery interface 230 is substantially identical to the battery interface 60 of the low-voltage electric tool 50 explained hereinabove with respect to FIGS. 17 and 18 and incorporated herein by reference. The two battery interfaces 230 are arranged side by side on the lower surface of the pack side unit 206 and the low-voltage battery packs 10 are respectively inserted therein in the same direction. The two low-voltage battery packs 10 attached to the pack side unit 206 are connected in series to the positive electrode output terminal 224a and the negative electrode output terminal 224b of the connector 220. As a result, the two low-voltage battery packs 10 supply current to the internal circuitry of the main body 72 of the high-voltage electric tool 70 at a voltage of about 36 volts. The adapter 200 enables the power tool 70 having the battery interface 80 dedicated for the high-voltage battery pack 30 to be connected to the low-voltage battery packs 10 and to be driven thereby. In addition, the autostop terminal 26 of the battery pack 10 is connected to the autostop terminal 236 of the pack side unit 206.

As shown in FIG. 11, the pack side unit 206 also includes two indicators 260. The two indicators 260 are respectively positioned above the two battery interfaces 230. Each indicator 260 is for example a light-emitting diode, but may be any other device that is capable of visually communicating information about the status of the attached battery pack 10, such as one or more incandescent lamps or one or more LCDs. The teachings concerning the indicator 160 discussed above with respect to the embodiment of FIGS. 2-4 are equally applicable to the present embodiment and thus the above-teachings concerning the indicator 160 are incorporated herein. Thus, for example, one indicator 260 may indicate a charge state or level of charge of the low-voltage battery pack 10 attached to one battery interface 230, and the other indicator 260 may indicate the same condition (level of charge) or another condition of the low-voltage battery pack 10 attached to the other battery interface 230. Each indicator 260 preferably indicates at least the charge state of its corresponding low-voltage battery pack 10. For example, the light-emitting diode can be illuminated when the charge state drops below a level at which recharging becomes necessary. Like the indicator 160, it is again preferred that the indicator 260 indicates the charge state of its corresponding low-voltage battery pack 10 at least in two levels. Also similar to the indicator 160, it is again preferred that the indicator 260 indicates a temperature abnormality of its corresponding low-voltage battery pack 10, instead of or in addition to the charge state thereof.

The two indicators 260 are preferably arranged side by side on one surface of the pack side unit 206 and have the same or substantially the same indication direction (that is, the same or substantially the same illumination direction of light-emitting diodes). Therefore, the user can see the two indicators 260 simultaneously and can simultaneously recognize the charge states of the two low-voltage battery packs 10. Further, the indicators 260 are preferably disposed above the corresponding battery interfaces 230. Therefore, for example, if the high-voltage electric tool 70 abruptly stops, the user can immediately determine which low-voltage battery pack 10 has experienced a problem or abnormality. The two indicators 260 can be also disposed, for example, on the main body side unit 202, rather than on the pack side unit 206. The two indicators 260 can be also arranged in other locations that can be simultaneously viewed by the user. It is preferred that the two indicators 260 are disposed in the same plane, so that the user can simultaneously see the two indicators 260 from various directions.

Similar to the indicator 160, the indicator 260 can be also provided in each low-voltage battery pack 10. As has already been explained above, the two battery interfaces 230 are arranged side by side and can receive the low-voltage battery packs 10 in the same direction. Therefore, when the two low-voltage battery packs 10 are attached to the pack side unit 206, the two indicators 260 are positioned side by side in the same plane and the direction of illumination is also the same. The user can thus simultaneously view the two indicators 260 from various directions.

Figure 12:
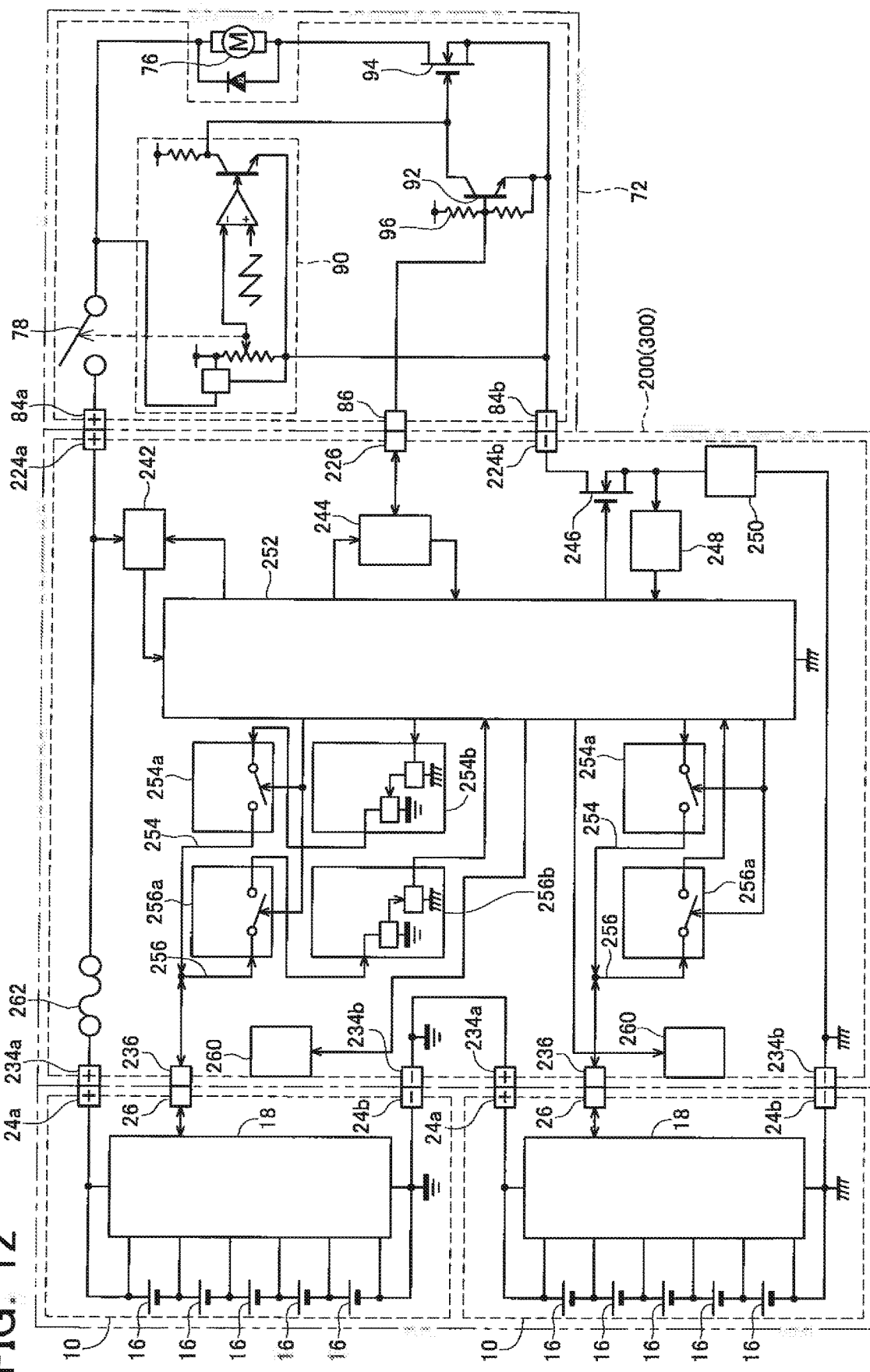
FIG. 12 is a schematic circuit diagram showing a representative electric circuit of the adapter of FIGS. 9-11.

An exemplary electric circuit of the adapter 200 will be explained below with reference to FIG. 12. As will be readily understood from a comparison of FIG. 12 with FIG. 5, the circuit of the adapter 200 is substantially identical to a part of the circuit disposed in the main body 102 of the above-described high-voltage electric tool 100. More specifically, a combination of the circuit of the main body 72 of the high-voltage electric tool 70 and the circuit of the adapter 200 shown in FIG. 12 is substantially identical to the circuit of the main body 102 of the high-voltage electric tool 100 shown in FIG. 5 (however, the power FET 246 is absent in FIG. 5).

First, the circuit of the main body 72 of the high-voltage electric tool 70 shown in FIG. 12 will be explained. The main body 72 of the high-voltage electric tool 70 is provided with a motor 76, a main switch 78, a speed adjusting circuit 90, a power FET 94, a gate-voltage-controlling transistor 92, and a voltage division circuit 96. The configurations of these components may be identical to those of the motor 176, main switch 178, speed adjusting circuit 190, power FET 194, gate-voltage-controlling transistor 192, and voltage division circuit 196 of the main body 102 of the high-voltage electric tool 100 described above with reference to FIGS. 5-8 and therefore an explanation thereof is not necessary here. Two low-voltage battery packs 10 are thus connected in series to the motor 76 via the adapter 200.

The adapter 200 is provided with a main controller 252, a power source circuit 242, a shunt resistor 250, a current detection circuit 248, an autostop signal input/output circuit 244, and a fuse 262. The main controller 252 is electrically connected to two indicators 260. The configurations of these components may be identical to those of the main controller 152, power source circuit 142, shunt resistor 150, current detection circuit 148, autostop signal input/output circuit 144, indicator 160, and fuse 162 in the main body 102 of the high-voltage electric tool 100 and therefore an explanation thereof also is not necessary here.

The adapter 200 is further provided with a power FET 246 between a negative electrode input terminal 234*b* connected to the low-voltage battery pack 10 and a negative electrode output terminal 224*b* connected to the high-voltage electric tool 70. Thus, two low-voltage battery packs 10 are electrically connected to the motor 76, and a discharge current produced by the two series-connected low-voltage battery packs 10 flows through this circuit. The main controller 252 is connected to the gate of the power FET 246 and can control the power FET 246. For example, the main controller 252 may shut off the power FET 246 when the output voltage of the current detection circuit 248 exceeds a predetermined value.

The functions of the power FET 246 will be explained below. When the adapter 200 is detached from the high-voltage electric tool 70, the connector 220 of the adapter 200 is exposed. When the two low-voltage battery packs 10 are attached to the adapter 200 in this state, a voltage of about 36 volts is generated across the positive electrode output terminal 224*a* and the negative electrode output terminal 224*b* in the connector 220. The positive electrode output terminal 224*a* and the negative electrode output terminal 224*b* are disposed in a slot of the adapter 200 as shown in FIG. 10. Therefore, foreign matter is generally prevented from coming into contact with the two output terminals 224*a*, 224*b*. However, the possibility of the foreign matter coming into contact with the two output terminals 224*a*, 224*b* cannot be completely excluded. For example, if the two output terminals 224*a*, 224*b* were to be short-circuited by foreign matter, a very large current flow could be generated inside the low-voltage battery pack(s) 10 or adapter 200. In the circuit according to the present embodiment, the power FET 246 is provided inside the adapter 200 so that, after the adapter 200 has been removed from the high-voltage electric tool 70, if very large current is detected, the circuit and thus the current flow can be cut off by the power FET 246.

The main controller 252 is electrically connected to an autostop terminal 236 of the battery interface 230 and can receive an input signal voltage (for example, an autostop signal) from the battery controller 18 and can output a signal voltage (for example, a discharge protection cancellation signal) to the battery controller 18. Cut-off switches 254*a*, 256*a* are provided, respectively, in a conductive path 254 that conducts the signal voltage from the main controller 252 to the battery controller 18 and in a conductive path 256 that conducts a signal voltage from the battery controller 18 to the main controller 252. Further, level-shifters 254*b*, 256*b* are also provided in the conductive paths 254, 256, respectively, in order to adjust the voltage of signals output from the battery controller 18 of the low-voltage battery pack 10 that is positioned on the high-voltage side, as was discussed above with respect to the exemplary level shifters 154*b*, 156*b* of FIGS. 5-8. Thus, the cutoff switches 154*a*, 156*a* and level shifters 154*b*, 156*b* described above with respect to the high-voltage electric tool 100 may be used without modification in the present embodiment and therefore an explanation thereof is not necessary here.

As described hereinabove, by using the adapter 200, the high-voltage electric tool 70 (which is designed to normally attach only one battery pack at the battery interface 80) can be operated with two low-voltage battery packs 10. By connecting the two low-voltage battery packs 10 in series to the motor 76, it is possible to supply a voltage of about 36 volts to the motor 76. As a result, the high-voltage electric tool 70 with a rated voltage of 36 volts can be driven by two low-voltage battery packs 10, each having a nominal voltage of 18 volts. Thus, the high-voltage electric tool 70 can be operated using already available low-voltage battery packs 10, without the need to purchase a high-voltage battery pack 30 that supplies a nominal voltage of 36 volts or the charger therefor. Each low-voltage battery pack 10 can also be individually used as the sole power source for the low-voltage electric tool 50, which operates with an 18 volt battery pack.

Figure 13:
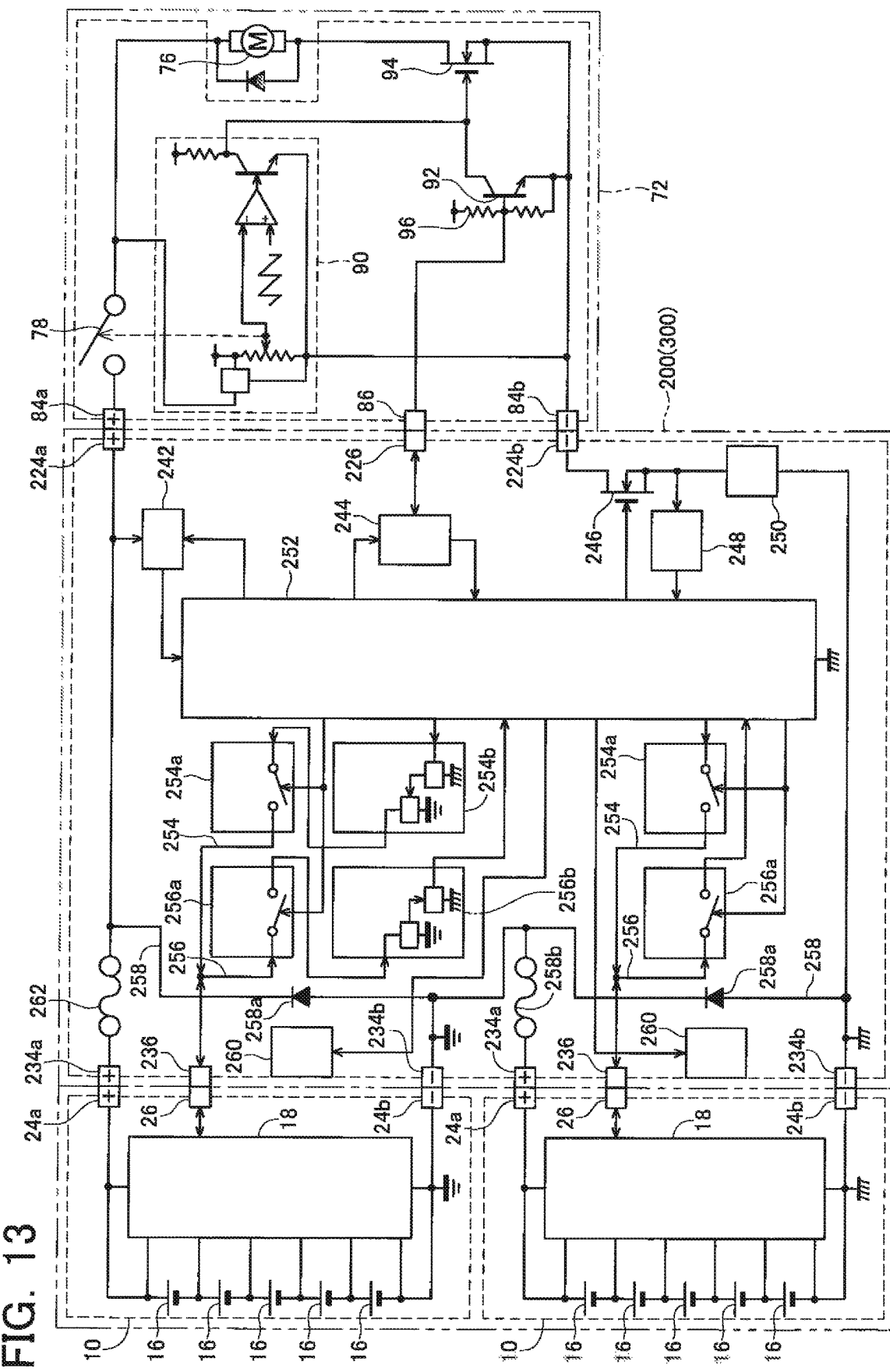
FIG. 13 is a modified example of the electric circuit of FIG. 12 having a bypass circuit added thereto.

FIG. 13 illustrates a modified example of the electric circuit of the adapter 200. In this modified example, two bypass circuits 258 are added to the circuit shown in FIG. 12. One bypass circuit 258 is provided for each respective low-voltage battery pack 10. The bypass circuit 258 includes a diode 258*a* and a fuse 258*b*. These bypass circuits 258 may be identical to the bypass circuits 158 of the high-voltage electric tool 100 described above with respect to FIGS. 6 and 8 and therefore an explanation thereof is not necessary here.

Figure 14:
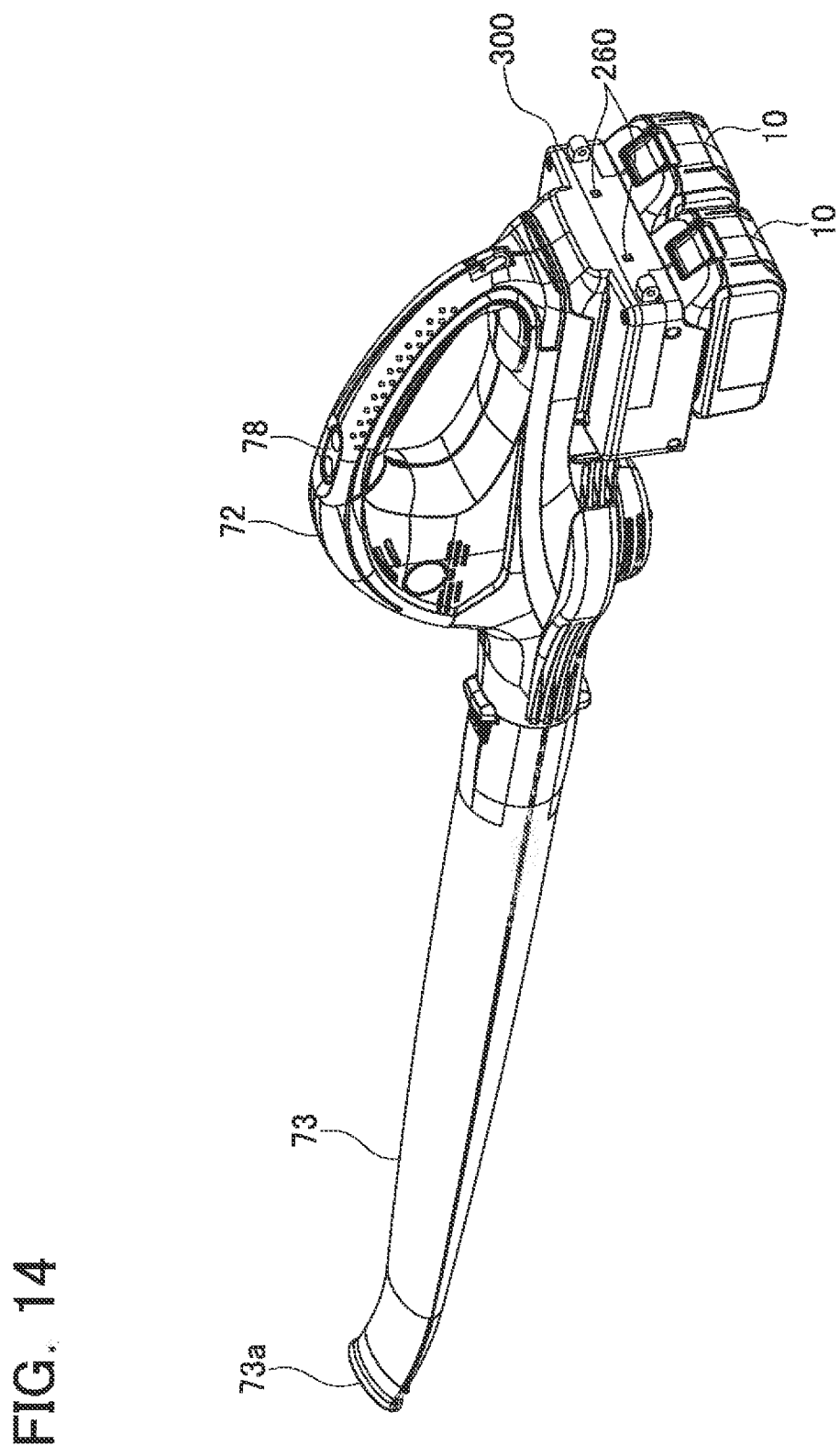
FIG. 14 shows two low-voltage battery packs connected to the main body of a high-voltage electric tool via an integrated or one-piece adapter.

Another (integrated) adapter 300 will be explained below with reference to FIGS. 14, 15, and 16. The tool shown in FIGS. 14-16 corresponds to the tool 70 shown in FIGS. 19-22, which was described above and is incorporated herein by reference. As shown in FIG. 14, the adapter 300 also serves to connect a plurality of low-voltage battery packs 10 to the high-voltage electric tool 70. Similar to the adapter 200, the adapter 300 also enables the power tool 70 having the battery interface 80 designed to receive the high-voltage battery pack 30 to be connected to the low-voltage battery packs 10 and to be driven thereby. In contrast with the above-described adapter 200, the entire circuitry for this adapter 300 is contained within one housing. That is, the portions, which correspond to the main body side unit 202 and pack side unit 206 of the above-described adapter 200, are integrated into a single housing. The electric circuitry of the adapter 300 may be functionally identical to the circuitry of the above-described adapter 200 shown in FIG. 12 or FIG. 13.

Figure 15:
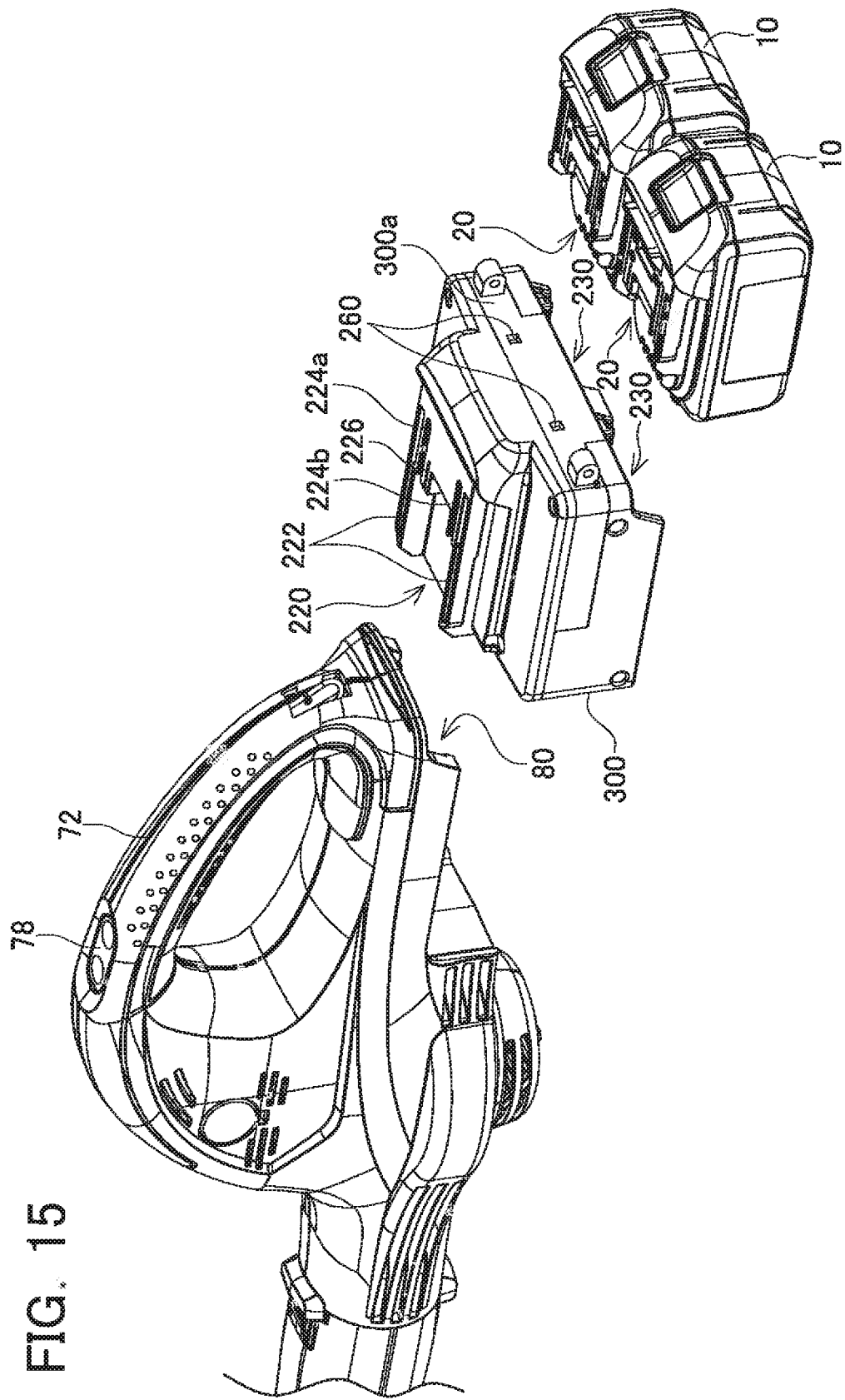
FIG. 15 shows an upper portion of the integrated adapter of FIG. 14 in greater detail.

As shown in FIG. 15, the connector 220 may be provided at or on the upper surface of the adapter 300 in the same manner as the connector 220 of the corded adapter 200 shown in FIG. 10. Thus, the connector 220 can be slidingly inserted into the battery interface 80 provided on the main body 72 of the high-voltage electric tool 70. The connector 220 includes a pair of rails 222, a positive electrode output terminal 224*a*, a negative electrode output terminal 224*b*, and an autostop terminal 226. The structures of connectors 220 in the two types of adapters 200, 300 may be substantially identical. Thus, when the connector 220 of the adapter 300 is attached to the battery interface 80, the positive electrode output terminal 224*a* of the adapter 300 is electrically connected to the positive electrode input terminal 84*a* of the battery interface 80, and the negative electrode output terminal 224*b* of the adapter 300 is electrically connected to the negative electrode input terminal 84*b* of the battery interface 80. As a result, the adapter 300 is electrically connected to the circuitry contained in the main body 72 of the high-voltage electric tool 70. In addition, the autostop terminal 86 is connected to the autostop terminal 226.

Figure 16:
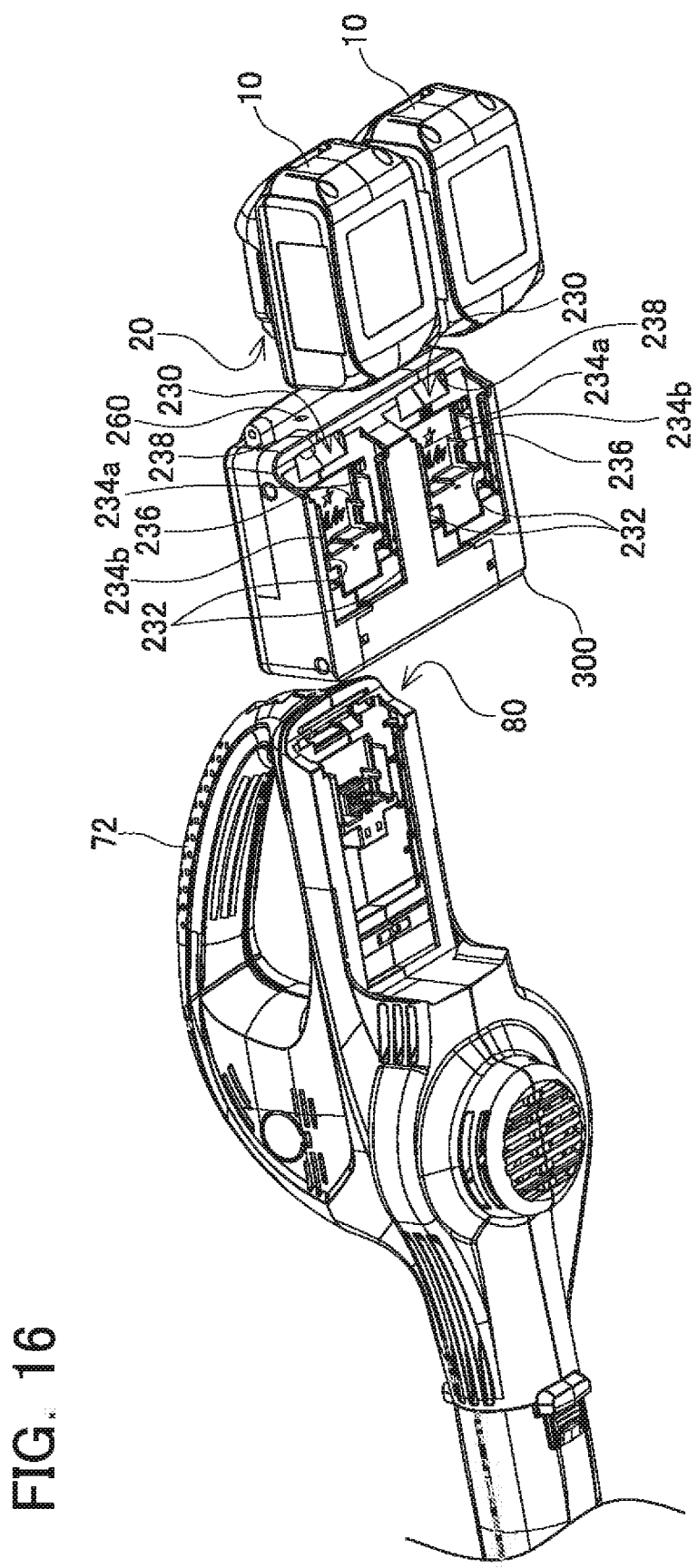
FIG. 16 shows a lower portion of the integrated adapter of FIG. 14 in greater detail.

As shown in FIG. 16, two battery interfaces 230 are provided on the lower surface of the adapter 300 in the same manner as the battery interfaces 230 of the corded adapter 200 shown in FIG. 11. Each battery interface 230 can removably receive or attach one low-voltage battery pack 10, and the low-voltage battery pack 10 can be slidably received thereby. The battery interface 230 has a pair of rails 232, a positive electrode input terminal 234a, a negative electrode input terminal 234b, and a latch receiving hole 238. The structures of the battery interfaces 230 of the two types of adapters 200, 300 may be substantially identical. The two battery interfaces 230 are arranged side by side on the lower surface of the pack side unit 206 and the low-voltage battery packs 10 are respectively inserted therein in the same direction. The two low-voltage battery packs 10 attached to the adapter 300 are connected in series to the positive electrode output terminal 224a and the negative electrode output terminal 224b of the connector 220. As a result, the two low-voltage battery packs 10 supply current to the circuitry contained in the main body 72 of the high-voltage electric tool 70 at a voltage of about 36 volts. In addition, the autostop terminal 26 of the battery pack 10 is connected to the autostop terminal 236 of the adapter 300.

As shown in FIG. 15, the adapter 300 is also provided with two indicators 260. The two indicators 260 are disposed on the rear surface 300a of the adapter 300. The two indicators 260 are respectively positioned above the two battery interfaces 230. Each indicator 260 comprises, e.g., a light-emitting diode or another light source, such as an incandescent light, or a display device such as an LCD, as was described above with reference to the indicator 260 of the corded adapter 200 and the indicator 160 of the embodiment of FIGS. 2-4, which description is again incorporated herein by reference. Thus, similar to the above embodiments, the indicator 260 may indicate a charge state of the low-voltage battery pack 10 attached to one battery interface 230, and the other indicator 260 may indicate the same or a different condition of the low-voltage battery pack 10 attached to the other battery interface 230. The two indicators 260 are preferably arranged side by side on the rear surface 300a of the adapter 300. Therefore, the user can see the two indicators 260 simultaneously and can simultaneously recognize the respective charge states or other indicated condition(s) of the two low-voltage battery packs 10. Further, the indicators 260 are preferably disposed above the corresponding battery interfaces 230. Therefore, for example, if the high-voltage electric tool 70 abruptly stops, the user can immediately determine which low-voltage battery pack 10 is experiencing a problem or abnormality.

As described hereinabove, by using the adapter 300, the high-voltage electric tool 70 can be operated using two low-voltage battery packs 10. By connecting the two low-voltage battery packs 10 in series to the motor 76, it is possible to supply a voltage of about 36 volts to the motor 76. As a result, the high-voltage electric tool 70 with a rated voltage of 36 volts can be driven by two low-voltage battery packs 10, each having a nominal voltage of 18 volts. Thus, the high-voltage electric tool 70 can be powered using already available low-voltage battery packs 10, without the need to purchase a high-voltage battery pack 30 having a nominal voltage of 36 volts or a charger therefor. Each low-voltage battery pack 10 can be also individually used as the sole power source for the low-voltage electric tool 50.

In the present description, the representative example of the low-voltage electric tool 50 is an electric drill, and the representative example of the high-voltage electric tools 70, 100 is an electric blower (leaf blower). However, the present teachings are not particularly limited to these types of electric tools and can be widely applied to a variety of types of electric tools, as was described above in the Summary section.

Specific embodiments of the present teachings are described above, but these embodiments merely illustrate some representative possibilities for utilizing the present teachings and do not restrict the claims thereof. The subject matter set forth in the claims includes variations and modifications of the specific examples set forth above.

The technical elements disclosed in the specification or the drawings may be utilized separately or in other combinations that are not expressly disclosed herein, but will be readily apparent to a person of ordinary skill in the art. Furthermore, the subject matter disclosed herein may be utilized to simultaneously achieve a plurality of objects or to only achieve one object, which object(s) may not be explicitly recited in the present disclosure.

Although the present teachings have been described with respect to a preferred usage of lithium-ion cells, the present teachings are, of course, applicable to any type of battery chemistry or technology, including but not limited to nickel-cadmium, nickel-metal-hydride, nickel-zinc, lithium iron phosphate, etc.

Further, although the representative electric power tool 100 and the adapters 200, 300 were illustrated as providing a serial connection of two battery packs 10, the battery interface 80 of the tool 100 or the adapters 200, 300 may, of course, be modified to connect three or more battery packs 10 in series and/or in parallel. Moreover, the first battery packs 10 are not all required to have the same nominal voltage and in certain applications of the present teachings, one first battery pack 10 could have a first nominal voltage, e.g., of 12 volts, and one first battery pack 10 could have a second nominal voltage, e.g., of 18 volts, i.e. the first and second nominal voltages of the two battery packs 10 are different. In this case, it is preferable that the first battery interfaces 130, 230 are configured differently, so as to be able to ensure that only the appropriate battery pack is attachable thereto. In addition or in the alternative, the main controller 152 of the tool 70, 100 or the main controller 252 of the adapter 200, 300, and its supporting circuitry, may be configured to recognize battery packs having different nominal voltages and process signals outputted from the respective CPUs of the battery packs appropriately.

The adapters 200, 300 may be modified to only provide a voltage level-shifting function and the tool motor controlling function may be performed by an integrated circuit, e.g., a microprocessor, located in the main body 72, 100 of the tool 70, 100. For example, the adapters 200, 300 are not required to include the main controller 252 and instead may include, e.g., only the level-shifters 254b, 256b and/or the cut-off switches 254a, 256a. Naturally, the adapters 200, 300 may also include the diode(s) 258a, the fuse(s) 258b and the indicators 260. In such embodiments, the functions of the main controller 252 are performed by circuitry located in the main body 72, 100 of the tool 70, 100. In this case, the level-shifters 254b, 256b preferably supply appropriate voltage-adjusted signals from the battery pack controllers 18 to the processor located in the main body 72, 102.

What is claimed is:

1. An adapter for connecting a plurality of first battery packs, each having a nominal voltage that is substantially equal to or greater than 18 volts but less than 36 volts, to a main body of an electric power tool having a rated voltage that is substantially equal to or greater than 36 volts, wherein the main body of the electric power tool comprises a second battery interface configured to removably attach a second battery pack and to electrically connect the second battery pack to an electric motor housed in the main body, the adapter comprising:

a plurality of first battery interfaces configured to removably attach the plurality of first battery packs, the first battery interfaces having a different physical configuration than the second battery interface such that the second battery pack is not connectable to the first battery interface;

a connector configured to be removably attached to the second battery interface, wherein the plurality of first battery interfaces is configured to electrically connect the attached first battery packs in series to the connector; and a plurality of visual indicators disposed on a surface of the adapter such that they have the same or substantially the same illumination direction, the visual indicators being configured to visually indicate at least a level of charge of each of the first battery packs respectively attached to the first battery interfaces.

2. The adapter according to claim 1, further comprising a housing on which the plurality of first battery interfaces and the connector are integrally formed.

3. The adapter according to claim 1, further comprising:
a first housing on which the plurality of first battery interfaces are integrally formed,
a second housing on which the connector is formed, and
a flexible cord extending from the first housing to the second housing and electrically connecting the plurality of first battery interfaces to the connector.

4. The adapter according to claim 1, wherein each of the visual indicators indicates whether or not the level of charge of the corresponding first battery pack has dropped below a predetermined threshold, thereby indicating the corresponding first battery pack requires recharging.

5. The adapter according to claim 1, wherein each of the first battery packs comprises a latch configured to engage a corresponding engagement structure defined on or near the corresponding first battery interface.

6. The adapter according to claim 1, wherein each of the first battery packs has a nominal voltage that is substantially equal to 18 volts, and the electric power tool has a rated voltage that is substantially equal to 36 volts.

7. The adapter according to claim 1, wherein each of the first battery packs comprises a plurality of lithium-ion cells connected in series.

8. The adapter according to claim 1, wherein each of the first battery packs comprises at least five lithium-ion cells connected in series.

9. The adapter according to claim 1, wherein the electric power tool is a leaf blower comprising a fan that is rotatably driven by an electric motor electrically connected to the second battery interface.

10. The adapter according to claim 1, wherein:
each of the first battery interfaces comprises a pair of first guide rails configured to slidably receive and engage corresponding rails on the first battery pack in a detachable manner and a first latch receiving hole configured to engage with a movable latch provided on the first battery pack, the first latch receiving hole being disposed between longitudinal axes of the pair of first guide rails; and the first battery interfaces are arranged side by side on a housing of the adapter such that all of the longitudinal axes of the pairs of first guide rails are intersected by a common plane.

11. The adapter according to claim 10, wherein the first latch receiving hole extends perpendicular to the longitudinal axes of the pairs of first guide rails.

12. The adapter according to claim 1, wherein:
each of the first battery packs comprises a latch configured to engage a corresponding engagement structure defined on or near the corresponding first battery interface,
each of the first battery packs has a nominal voltage that is at least substantially equal to 18 volts, and wherein the electric power tool has a rated voltage that is at least substantially equal to 36 volts, and
each of the first battery packs comprises at least five lithium-ion cells connected in series.

13. The adapter according to claim 12, further comprising a housing on which the plurality of first battery interfaces and the connector are integrally formed.

14. The adapter according to claim 12, further comprising:
a first housing on which the plurality of first battery interfaces are integrally formed,
a second housing on which the connector is formed, and
a flexible cord extending from the first housing to the second housing and electrically connecting the plurality of first battery interfaces to the connector.

15. The adapter according to claim 1, further comprising a controller electrically connected to the plurality of first battery interfaces and to the plurality of visual indicators, the controller being configured to detect the level of charge of each of the first battery packs and to change the visual state of the corresponding visual indicator when the detected level of charge of one or more of the first battery packs falls below a predetermined voltage threshold.

16. An adapter comprising:
at least one housing;
first means for electrically connecting in series a plurality of first battery packs, each having a nominal voltage that is substantially equal to or greater than 18 volts but less than 36 volts, to a second means for electrically connecting to a battery interface of an electric power tool, the battery interface being configured to connect to a second battery pack having a nominal voltage substantially equal to or greater than 36 volts and being configured such that the first battery packs are not directly connectable to the battery interface; and
third means for visually indicating at least a level of charge of each of the first battery packs;
wherein at least the first means and the third means are disposed, at least partially, on a surface of the at least one housing.

17. The adapter according to claim 16, further comprising a controller disposed within the at least one housing and configured to detect the level of charge of each of the first battery packs and to change the visual state of the third means when the detected level of charge of one or more of the first battery packs falls below a predetermined voltage threshold.

18. A power supply interface for an electric power tool, comprising:
first and second battery pack interfaces, each having a positive battery input terminal, a negative battery input terminal and a battery controller input terminal, and a controller configured to receive an autostop signal from each battery controller input terminal and to electrically disconnect a load of the power tool in response to receipt of at least one autostop signal.

19. The power supply interface according to claim 18, further comprising:
a first visual indicator configured to visually indicate a condition of a first battery pack attached to the first battery pack interface, and
a second visual indicator configured to visually indicate a condition of a second battery pack attached to the second battery pack interface,
wherein the controller is further configured to activate the first visual indicator in response to receiving an autostop signal from the battery controller input terminal of the first battery pack interface and to activate the second visual indicator in response to receiving an autostop signal from the battery controller input terminal of the second battery pack interface.

20. The power supply interface according to claim 19, wherein:
the autostop signal represents a condition that a voltage of at least one battery cell in the first or second battery pack has fallen below a threshold value; and
the controller is configured such that, when the controller detects the autostop signal either at the battery controller input terminal of the first battery pack interface or at the battery controller input terminal of the second battery pack interface, the controller disconnects the supply of current from the first and/or second battery pack conducted via the positive and negative battery input terminals of the first and/or second battery pack interview from the load of the power tool.

\* \* \* \* \*